US 8,503,739 B2

(12) United States Patent
Bourdev et al.

(10) Patent No.: US 8,503,739 B2
(45) Date of Patent: Aug. 6, 2013

(54) SYSTEM AND METHOD FOR USING CONTEXTUAL FEATURES TO IMPROVE FACE RECOGNITION IN DIGITAL IMAGES

(75) Inventors: Lubomir D. Bourdev, San Jose, CA (US); Jiang Xu, Evanston, IL (US)

(73) Assignee: Adobe Systems Incorporated, San Jose, CA (US)

( * ) Notice: Subject to any disclaimer, the term of this patent is extended or adjusted under 35 U.S.C. 154(b) by 415 days.

(21) Appl. No.: 12/857,351

(22) Filed: Aug. 16, 2010

(65) Prior Publication Data

US 2013/0121584 A1 May 16, 2013

Related U.S. Application Data

(60) Provisional application No. 61/243,928, filed on Sep. 18, 2009.

(51) Int. Cl.
*G06K 9/00* (2006.01)

(52) U.S. Cl.
USPC ............................ 382/118; 382/225; 382/305

(58) Field of Classification Search
USPC ......................................... 382/118, 225, 305
See application file for complete search history.

(56) References Cited

U.S. PATENT DOCUMENTS

| | | | | |
|---|---|---|---|---|
| 7,376,276 | B2 * | 5/2008 | Shniberg et al. | 382/224 |
| 7,548,637 | B2 * | 6/2009 | Xiong et al. | 382/118 |
| 7,680,343 | B2 * | 3/2010 | Covell et al. | 382/224 |
| 8,331,632 | B1 * | 12/2012 | Mohanty et al. | 382/118 |
| 2003/0210808 | A1 * | 11/2003 | Chen et al. | 382/118 |
| 2006/0061598 | A1 * | 3/2006 | Mino et al. | 345/629 |
| 2006/0140455 | A1 * | 6/2006 | Costache et al. | 382/118 |
| 2007/0230799 | A1 * | 10/2007 | Shniberg et al. | 382/224 |
| 2008/0219564 | A1 * | 9/2008 | Covell et al. | 382/224 |
| 2008/0298766 | A1 * | 12/2008 | Wen et al. | 386/46 |
| 2008/0304755 | A1 * | 12/2008 | Xiao et al. | 382/225 |
| 2009/0252383 | A1 * | 10/2009 | Adam et al. | 382/118 |
| 2010/0185981 | A1 * | 7/2010 | Nakada et al. | 715/810 |
| 2010/0202707 | A1 * | 8/2010 | Costache et al. | 382/224 |
| 2010/0226584 | A1 * | 9/2010 | Weng et al. | 382/225 |
| 2011/0043437 | A1 * | 2/2011 | Tang et al. | 345/55 |
| 2011/0055766 | A1 * | 3/2011 | Ogawa et al. | 715/838 |
| 2011/0150340 | A1 * | 6/2011 | Gotoh et al. | 382/190 |

(Continued)

OTHER PUBLICATIONS

D. Anguelov, K.C. Lee, S.B. Gokturk, and B. Sumengen. Contextual identity recognition in personal photo albums. CVPR 1007, 7 pages.
Y. Song and T. Leung. Context-aided Human Recognition—Clustering, ECCV 2006, May 2006, 14 pages.

(Continued)

*Primary Examiner* — Aaron W Carter
(74) *Attorney, Agent, or Firm* — Wolfe-SBMC

(57) ABSTRACT

Various embodiments of a system and methods for using contextual features to improve face recognition in digital images are described. A face recognition system may semi-automatically label faces and/or search for faces in images. Faces may be detected in the images and visual and non-visual features may be determined for each face. The determined features may be facial and/or contextual features. Features may also be determined from labels assigned to the faces. Pair-wise comparisons of the faces, using the determined features, may determine distances between pairs of faces. Some features may be used to determine the relevance of other features. Dependent on the calculated distances, similar faces may be grouped and suggested labels for faces may be provided. The system may be scalable, processing faces in groups to limit the use of system resources to a certain amount, regardless of the size of a digital image collection.

20 Claims, 8 Drawing Sheets

U.S. PATENT DOCUMENTS

2011/0292232 A1* 12/2011 Zhang et al. ............... 348/222.1
2011/0293188 A1* 12/2011 Zhang et al. ................. 382/190
2013/0039545 A1* 2/2013 Kovtun et al. ............... 382/104
2013/0070975 A1* 3/2013 Begeja et al. ................ 382/118

OTHER PUBLICATIONS

A. Gallagher and T. Chen, Estimating Age, Gender and Identity using First Name Priors, CVPR 2008, 8 pages.

* cited by examiner

You labeled these face(s) as Bob:

Are these faces also Bob?

☒ Yes          ☒ Yes

☐ No, it's [    ]    ☐ No, it's [    ]

You labeled these face(s) as Jane:

Are these faces also Jane?

☐ Yes

☒ No, it's [ Sarah ]

SYSTEM AND METHOD FOR USING CONTEXTUAL FEATURES TO IMPROVE FACE RECOGNITION IN DIGITAL IMAGES

PRIORITY INFORMATION

This application claims benefit of priority of U.S. Provisional Application Ser. No. 61/243,928 entitled "System and Method for Using Contextual Cues to Improve Face Recognition" filed Sep. 18, 2009, the content of which is incorporated by reference herein in its entirety.

BACKGROUND

An advantage of digital photography over film is the ability to capture a multitude of images with little or no added expense. As a result, it is common for photographers to accumulate large digital image collections that can be difficult to maintain and difficult to browse serially. Unlike conventional film-based photographs, digital photographs can be loaded onto a computer system. Photographs can then be accessed, organized and manipulated using photograph management software. In managing a collection of digital photographs, it is quite useful to assign labels, or tags, to the photographs, to facilitate subsequent operations involving the photographs. For example, photographs can be labeled with the names of the people that appear in the photographs to facilitate subsequent retrieval of photographs containing a specific person. It is also useful to search a collection of digital photographs that has not been labeled for people that match an identified person.

It can be very time-consuming to label all of the faces that appear in a large collection of digital images, especially when a user must manually locate and label each face in the image. Conventional systems use traditional face recognition techniques to match faces detected in a digital image collection, which may reduce the time required for the labeling process. However, such conventional systems extract a limited set of features from faces that appear in images and use this limited set of features to determine whether the faces match (e.g., belong to the same person). This limited set of features may cause conventional systems to incorrectly match faces. These incorrect matches must be manually corrected by the user, which may be time-consuming for a large digital image collection, and frustrating to the user.

Matching similar faces within a large digital image collection is a computationally expensive effort which takes a significant amount of time and uses a significant amount of resources on a computer system. Conventional systems are not scaled such that the use of time and system resources is limited to desired levels. Rather, the time and system resources used by a conventional system are proportional to the size of a digital image collection. A conventional system processing a large digital image collection may use an unreasonable amount of time and may significantly over-burden the resources of a computer system, which is also frustrating for a user.

SUMMARY

Various embodiments of a system and methods for using contextual features to improve face recognition in digital images are described. A face recognition system may provide a semi-automated mechanism by which a user may label all of the faces that appear in a collection of digital images. Embodiments of the face recognition system may analyze a collection of digital images to detect all faces that appear in each image of the collection. The face recognition system may determine both visual and non-visual features for each face detected in the set of digital images. Visual features may be facial features that represent the characteristics of a face, such as skin tone, eye color, and/or other facial features. Visual features may also be non-facial, contextual features that represent the characteristics of a person, such as clothes features, hair features, and/or other non-facial features. The face recognition system may also determine non-visual, contextual features from data associated with a digital image in which a face appears. For example, the face recognition system may determine the timestamp, location (e.g. geo-tag), name, and/or tags associated with a digital image.

The face recognition system may compare the visual and non-visual features for each pair of faces detected in the set of digital images. The contextual features determined by the face recognition system may provide cues, in addition to the facial features, that may enable the face recognition system to more accurately match, and/or distinguish between, faces in a set of digital images. The face recognition system may calculate a distance for each pair of faces dependent on the comparison of visual and non-visual features for the pair of faces. The distance may correspond to a measure of similarity between the two faces of the pair. The face recognition system may use the calculated distances to group similar faces and provide reasonably accurate suggestions of labels to apply to the faces.

The face recognition system may be scalable, such that the amount of system resources used for processing (e.g., labeling) detected faces at any given time does not exceed a maximum limit. The face recognition system may activate, or select, from the set of detected faces, a pre-determined number of faces for processing (e.g., labeling) as a group. The set of faces selected for processing (e.g., the activated faces) may be a subset of all of the detected faces and may be referred to herein as the set of "active" faces. The remaining (e.g., unselected) faces in the set of detected faces may be referred to herein as the set of "un-active" faces. The face recognition system may perform pair-wise comparisons and distance calculations for each pair of faces in the set of active faces. As active faces complete processing (e.g., receive labels), the active faces may be deactivated. The face recognition system may then activate additional faces to create a new set of active faces. Pair-wise comparisons and distance calculations may then be performed on the new active faces. Processing a pre-determined number of active faces, which is less than the total number of detected faces in a set of digital images, may ensure that the amount of system resources used by the face recognition system at any given time is independent of the number of images, or number of faces, in a set of digital images. Accordingly, the face recognition system may be a scalable system.

Figure 1:
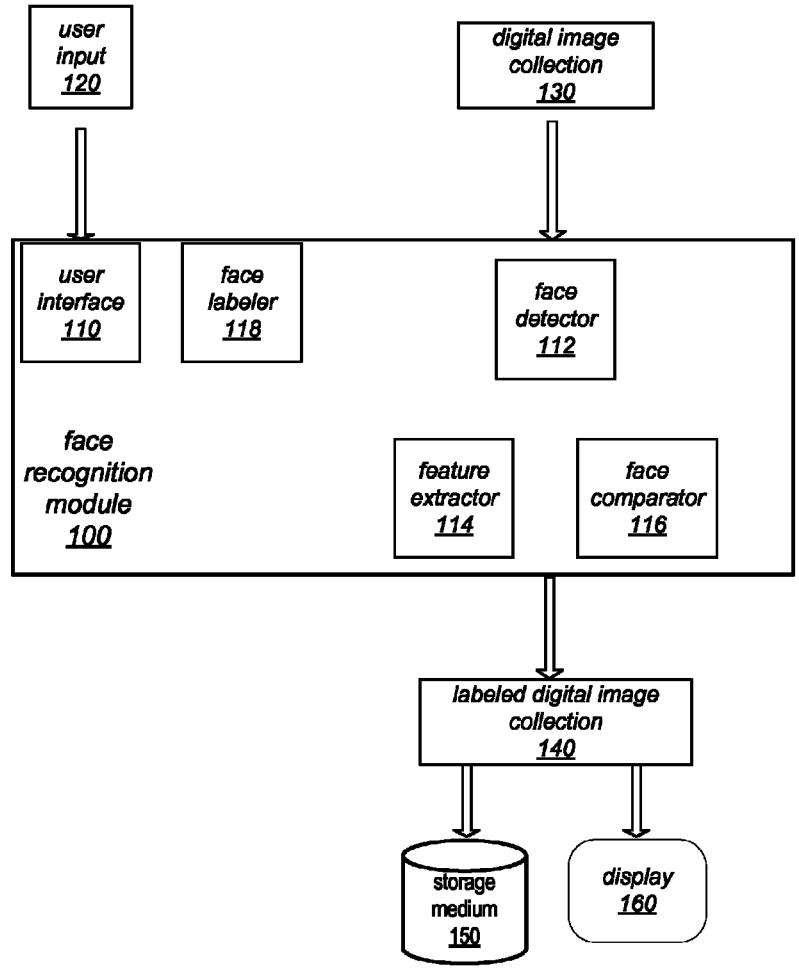
FIG. 1 illustrates an example of a face recognition module which may be used to recognize and label faces in digital images, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (e.g., meaning having the potential to), rather than the mandatory sense (e.g., meaning must). Similarly, the words "include", "including", and "includes" mean including, but not limited to.

DETAILED DESCRIPTION OF EMBODIMENTS

Various embodiments of a system and methods for using contextual features to improve face recognition in digital images are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description may be presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Introduction

Various embodiments of a system and methods for using contextual features to improve face recognition in digital images are described herein. For simplicity, embodiments of the system and methods for using contextual features to improve face recognition in digital images described herein will be referred to collectively as a face recognition system. Some embodiments of the face recognition system, as described herein, may provide a semi-automated mechanism by which a user may label all of the faces that appear in a collection of digital images. A label assigned to a face, which may also be referred to as a "tag", may be a person's name. Other embodiments of the face recognition system may provide a mechanism by which a user may search a collection of digital images for faces which match an identified face. Examples of digital images may include, but are not limited to, images captured by a digital camera, photographs scanned into a computer system, and video frames extracted from a digital video sequence. A collection of digital images may be a set of digital photographs organized as a digital photo album, a set of video frames which represent a digital video sequence, or any set of digital images which are organized or grouped together.

Various embodiments of the face recognition system may analyze a collection of digital images to detect all faces that appear in each image of the collection. The set of detected faces may be stored by the face recognition system in a memory medium such as a storage device or storage medium. The face recognition system may select, from the set of detected faces, a number of faces for processing (e.g. identifying and labeling of each individual face) as a group. Such a set of faces selected for processing are referred to herein as the set of "active" faces. The remaining (e.g., unselected) faces in the set of detected faces are referred to herein as the set of "un-active" faces.

The face recognition system may remove faces which have completed processing (e.g., have been labeled) from the set of active faces and replace the removed faces with new faces selected from the set of un-active faces. A number of new faces may be chosen such that a same, pre-determined number of faces remain active at any one time. The number of faces which may remain active at any given time may be determined by an amount of system resources (e.g., CPU, memory, etc.) available for use by the face recognition system. Accordingly, the face recognition system may be scalable, such that the system may be configured to use only a certain amount of system resources for processing a digital image collection, regardless of the number of images in the digital image collection. The amount of system resources used at any given time by the face recognition system may be determined by the number of faces processed at one time by face recognition system, which may be the number of faces in the active faces group. More specifically, a number which designates how many active faces may be selected for processing by the face recognition system may be chosen such that the face recognition system does not exceed a certain level of system resource use at any given time.

To identify faces in a set of digital images, the face recognition system may determine both visual and non-visual features for each person for which a face is detected in the set of digital images. Visual features may be a variety of facial features that represent the characteristics of a face and/or contextual features which may be non-facial features that represent the characteristics of a person in a digital image. Examples of visual, facial features that may be determined by the face recognition system may include, but are not limited to: skin tone, eye color, presence of facial hair and biometric parameters which may indicate the structure of a face (e.g., width of face, distance between eyes, nose shape and size, mouth shape and size). Examples of visual, contextual features that may be determined by the face recognition system may include, but are not limited to, hair features (e.g., color and/or shape), clothes features (e.g., color, texture and/or type), headwear (e.g., hats), jewelry (e.g., necklace, earrings), and sunglasses (e.g. color, size, type). The contextual features determined by the face recognition system may provide additional cues that may be used by the face recognition system to recognize faces in digital images. For example, the face recognition system may be able to more accurately distinguish between two faces with similar facial features by comparing contextual features such as clothing, headwear, and/or jewelry.

Non-visual, contextual features that may be determined by the face recognition system may be determined from data that is associated with a digital image in which a face appears. Examples of non-visual features may include, but are not limited, to the timestamp, location (e.g. geo-tag), name, and/or tags associated with a digital image. The face recognition system may determine such non-visual features. The non-visual, contextual features may serve as contextual cues which may help identify faces in digital images. For example, the timestamps and locations of two digital images may be additional cues that may help determine whether the same people are pictured in both of the digital images. Non-visual, contextual features may be used to determine the relative importance of other visual features. For example, the timestamps associated with two digital images may determine whether a comparison of the clothes worn by the people in the two digital images is appropriate. More specifically, the face recognition system may only compare clothes between two digital images if the difference between the timestamps of the two digital images is less than twelve hours. The visual and non-visual features that define the characteristics of a person in a digital image may, for simplicity, be referred to herein as features which correspond to a face, or may be referred to herein as features of a face. Accordingly, features which correspond to a face may be clothes features, timestamp features, and/or other examples of features that may not be actual characteristics of a face, but may describe the characteristics of a person represented by a face. Actual facial characteristics are referred to herein specifically as facial features.

The face recognition system may infer contextual features from labels that are applied to faces. A label that is applied to a face may indicate the identity of the face. For example, a label may be a name associated with the face. The face recognition system may infer contextual features such as gender, race and/or age from the label, or name, assigned to a face. In some embodiments, the face recognition system may use a trained classifier to infer the gender, race and/or age typically associated with a name. The contextual features inferred from a label assigned to a face may provide additional cues that may be used by the face recognition system to identify faces in a set of digital images. For example, the gender of a face may be difficult to determine from an image of the face if the image is a profile or if the facial structure is obscured by sunglasses. In such an example, the face recognition system may still be able to determine gender from a label that has been applied to the face. These additional contextual cues may enable the face recognition system to more accurately compare unlabeled faces to labeled faces and, as a result, may provide more cues for identifying the unlabeled faces.

Face Recognition Module

Figure 8:
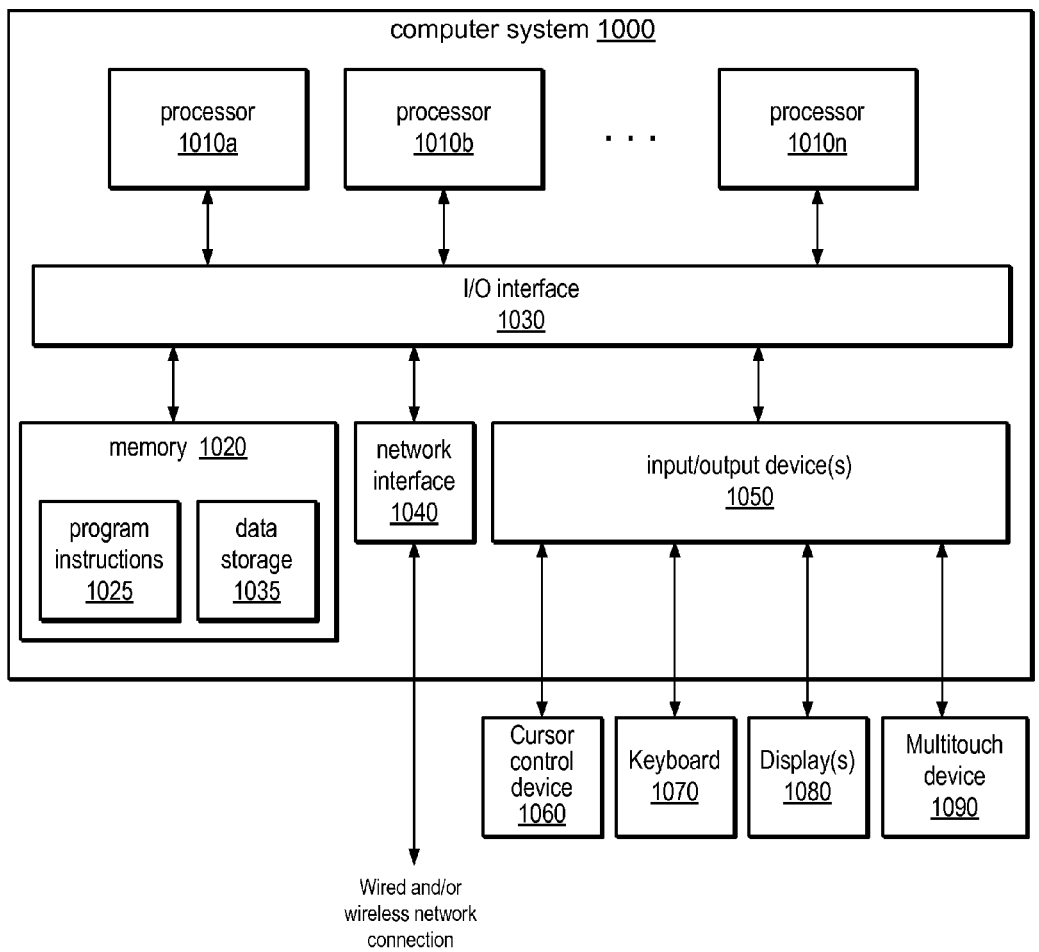
FIG. 8 illustrates an example computer system that may be used in embodiments.

Embodiments of the method for using contextual features to improve face recognition in digital images may be implemented, for example, in a face recognition module. An example face recognition module is illustrated in FIG. 1. An example system on which embodiments of a face recognition module may be implemented and executed is illustrated in FIG. 8. Face recognition module 100 (or, simply, module 100) may be implemented as or in a stand-alone application or as a module of or plug-in for an image processing and/or image management application, e.g., for managing a digital photograph collection or archive. Examples of types of applications in which embodiments of module 100 may be implemented may include, but are not limited to, image analysis and editing, processing, and/or presentation applications, as well as applications in security or defense, educational, scientific, medical, publishing, digital photography, digital films, games, animation, marketing, and/or other applications in which digital image analysis, editing or presentation may be performed. Specific examples of applications in which embodiments may be implemented include, but are not limited to, Adobe® Photoshop® and Adobe® Photoshop Elements®. Module 100 may also be used to display, manipulate, modify, classify, and/or store images, for example to a memory medium such as a storage device or storage medium.

Face recognition module 100 may receive as input a collection of digital images, such as digital image collection 130 illustrated in FIG. 1. Digital image collection 130 may be a collection of digital images (e.g. photographs) grouped, for example, as a digital photo album. Examples of digital images may include, but are not limited to Joint Photographic Experts Group (JPEG) files, Graphics Interchange Format (GIF) files, Tagged Image File Format (TIFF) files, or Portable Network Graphics (PNG) files. The digital images of digital image collection 130 may include images of various people which a user may wish to identify by assigning a label to each person. Labeling each person that appears in the digital image collection may allow a user to perform future searches to locate a particular person or persons within the digital image collection. For example, a user may wish to perform a search of the digital image collection in order to locate all images which contain a person labeled as "Ellen." Since facial characteristics may be a convenient mechanism for recognizing a person in an image, people in digital images may be identified by their faces. Similarly, a label which identifies a person in a digital image may be associated with the person's face in the image. Accordingly, the "labels" referred to herein are labels associated with a face in a digital image.

A label associated with a face in a digital image may typically be the name of the person in the digital image, although other types of labels are possible. For example, a label may be a description that otherwise identifies a person or identifies a person as part of a particular group (e.g., "family" or "classmate"). Labels assigned to faces in digital images may also be referred to as "tags." Face recognition module 100 may semi-automatically assign labels to each face that appears in digital image collection 130. Face recognition module 100 may use labels provided by the user that identify faces which appear in images of digital image collection 130. Such user input, illustrated as user input 120 in FIG. 1, may be received by user interface 110 of module 100. In some embodiments, user interface 110 may include one or more user interface elements via which a user may interact with the module 100, for example to specify, select, or change the value for one or more labels identifying one or more persons in digital image collection 130.

Face detector 112 of module 100 may analyze digital image collection 130 to detect all of the faces that appear in the images of digital image collection 130. As described in further detail below, various algorithms may be used by face detector 112 to detect the faces which appear in digital image collection 130. Such algorithms may include, for example, facial patterns defined by Eigenfaces, Adaboost classifier training algorithms, and neural network-based face detection algorithms. Feature extractor 114 of module 100 may extract visual and non-visual features, and facial and contextual features. The features may represent each person in a digital image for which a face is detected by face detector 112. For each detected face, feature extractor 114 may create a feature vector which may contain values that represent the features which correspond to the detected face. Face comparator 116 may compare the feature vectors of a pair of faces to determine a measure of similarity between the pair of faces. Face comparator 116 may compute a distance which corresponds to the measure of similarity between the pair of faces. Face labeler 118 of module 100 may use the distances to cluster the faces into groups which contain faces with similar features (e.g. distances below a certain threshold). Face labeler 118 may use the groups of faces, along with user input 120, to assign labels to each face that appears in digital image collection 130. Module 100 may generate as output a labeled digital image collection 140, with each face in the collection associated with a label. Labeled digital image collection 140 may, for example, be stored to a storage medium 150, such as system memory, a disk drive, DVD, CD, etc., and/or displayed on a display 160.

Work Flow

Figure 2:
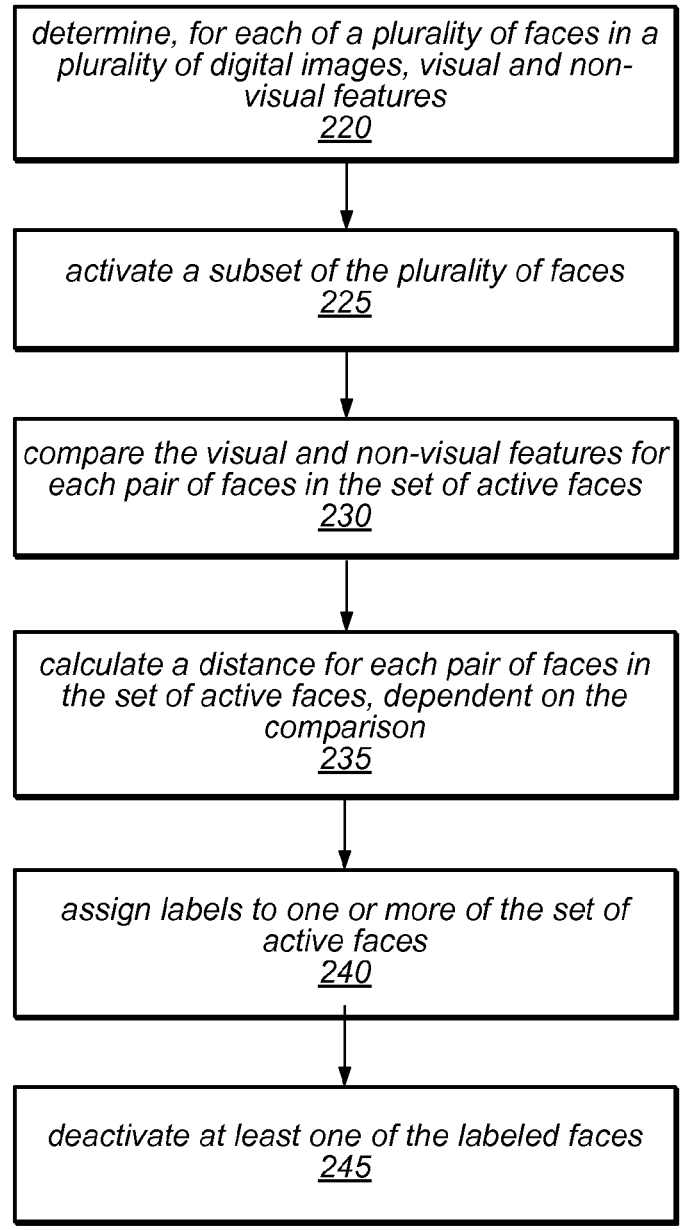
FIG. 2 is a flowchart of a method for using contextual features to improve face recognition in digital images, according to some embodiments.

Face recognition module 100 may implement the method illustrated in FIG. 2 for using contextual features to improve face recognition in digital images. As illustrated in FIG. 2 and described in further detail below, face recognition module 100 may determine visual and non-visual features for each face that appears in a collection of digital images, such as digital image collection 130. Face recognition module 100 may execute a scalable face recognition process by activating a subset of the faces in the digital image collection to create a set of active faces. Within the set of active faces, face recognition module 100 may compare each pair of faces and calculate a distance between each pair of faces based on the comparison. Face recognition module 100 may use the distances (in addition to user input, as described in further detail below) to assign labels to one or more of the faces in the set of active faces. Face recognition module 100 may deactivate at least one of the labeled faces. If any additional unlabeled faces exist, face recognition module 100 may continue activating additional faces, calculating distances between the active faces and labeling the faces, repeating blocks 225 through 245 of FIG. 2. Face recognition module 100 may continue to repeat the process until all of the faces that appear in the digital image collection have been labeled.

As indicated at 220, face recognition module 100 may determine, for each of a plurality of faces in a plurality of digital images, visual and non-visual features. Face recognition module 100 may analyze a set of digital images, such as digital image collection 130 (e.g., a digital photo album), to detect the faces of all of the people that appear in the set of digital images. As described above, face detector 112 of face recognition module 100 may perform the analysis of the set of digital images to detect faces that appear in the set of digital images. To detect faces that appear in a digital image, face detector 112 may identify regions or portions of the digital image that may correspond to a face depicted in the digital image. In various embodiments, various techniques may be used by face detector 112 to identify such regions or portions of a digital image that may correspond to a face. As described in further detail below, some example techniques may include, but are not limited to, facial patterns defined by Eigenfaces, Adaboost classifier training algorithms, and neural network-based face detection algorithms.

Feature extractor 114 of face recognition module 100 may determine both visual and non-visual features which correspond to each face detected in a set of digital images. As described in further detail below, feature extractor 114 may create, for each detected face, a feature vector which contains values that represent the determined features for the face. Visual features corresponding to a face in a digital image, which may be either facial features or contextual features, may be determined from the image data (e.g., the pixel data) of the digital image, as described in further detail below. For example, pixel color may be used to determine skin tone and/or hair color. Examples of visual, facial features that may be determined from image data of a digital image may include, but are not limited to: skin tone, eye color, presence of facial hair, and biometric parameters which may indicate the structure of a face (e.g., distance between eyes, shape of nose). Examples of visual, contextual features that may be determined from image data of a digital image may include, but are not limited to gender, race, age, hair color and/or structure (e.g., length), clothes texture, type and/or color, and presence of sunglasses. As described in further detail below, some contextual features, such as gender, race and age may be inferred from image data using a classifier trained to recognize data which indicates a specific contextual feature (e.g. image data that indicates gender is female).

Non-visual features corresponding to a face, which may be contextual features, may be determined from data associated with a digital image, as described in further detail below. For example, the timestamp and the name associated with a digital image may be non-visual, contextual features which correspond to each face depicted in the digital image. The non-visual, contextual features may serve as contextual cues which may help identify faces in digital images. For example, the difference between timestamps of two digital images may determine whether a person depicted in both digital images is likely to be wearing the same clothes. Examples of non-visual contextual features that may be determined from data associated with a digital image may include, but are not limited to: timestamp, image name, image location (e.g. a geo-tag associated with the image), and image tag.

As described in further detail below, determining visual and non-visual features for the persons for which faces are detected in a set of digital images (e.g., as illustrated at 220) may be performed as a background task. For example, a background process may be constantly running that detects new images (e.g., in a My Pictures folder or other likely location for images to be kept) and automatically performs face detection processing on the new images when system resources (e.g., CPU, memory, etc.) are available. As described below, a user may indicate, via user interface 110, whether face detection processing should be executed as a background task.

The method illustrated in FIG. 2 for using contextual features to improve face recognition in digital images may include, as indicated at 225, activating a subset of the plurality of faces in the set of digital images. Face recognition module 100 may activate a predetermined number of faces (e.g., a subset of faces) from the plurality of faces in the set of digital images. A face that has been activated by face recognition module 100 is referred to herein as an "active" face. As referenced herein, an active face may be a face for which image data corresponding to the face is loaded into system memory for processing (e.g., labeling). Activating a subset of the faces from a set of digital images for processing as a group (while leaving other faces from the set of digital images un-activated) may enable a scalable face recognition system which may use a predictable and controllable amount of system resources.

As described in further detail below, face recognition module 100 may perform a number of different computations to label all of the faces in a set of digital images. For example, face recognition module 100 may perform pair-wise comparisons between detected faces to determine a distance between the pairs of faces. As another example, face recognition module 100 may use the distances resulting from the pair-wise comparisons to divide the faces into groups based on the distances. These computations, when performed on a set of digital images containing a large number of digital images (and, thus, a large number of faces) may use a significant amount of system resources (e.g. memory, CPU bandwidth) and may require a significant amount of time for completion.

A typical digital photo album may easily contain at least 1000 faces. The number of pair-wise comparisons for a group of N faces may be calculated as shown in equation 1:

$$(N(N+1))/2 \qquad (1)$$

Accordingly, performing a pair-wise comparison for all 1000 faces in a typical digital photo album may require 500,500 computations. Furthermore, storing the calculated distances from each pairwise comparison may require a significant amount of memory space. The number of computations required to divide a set of N faces into clusters of similar faces may be calculated as shown in either equation (2) or equation (3), depending on the clustering algorithm used.

$$O(N^2 \log(N)) \qquad (2)$$

$$O(N^3) \qquad (3)$$

Accordingly, grouping 1000 faces into clusters of similar faces may require 3,000,000 to 1,000,000,000 computations, depending on the clustering algorithm used. As the number of images (and, thus, the number of faces) in a digital photo album increases, the number of computations for pair-wise comparisons and clustering may also significantly increase. Accordingly, labeling all of the faces in a digital photo album containing a large number of images may be a significant burden on the resources (e.g. memory, CPU bandwidth) of a computer system and may require a significant amount of time for completion.

As described above, face recognition module 100 may process the faces in a set of digital images in groups, activating one group of faces at a time for processing. Processing the faces in a set of digital images in groups may control the amount of system resources used by the face recognition module at any one time. For example, the size of the set of activated faces to be processed as a group may be determined by the amount of available system resources (e.g., CPU speed, memory, etc.). Using equations such as (1), (2) and/or (3) above, the number of computations required for processing a group of N faces may be calculated. Based on the calculated number of computations, an amount of system resources which may be required to process the group of N faces may be determined. Accordingly, an appropriate number of N faces for a group may be determined such that an available amount (or desired amount) of system resources is not exceeded during the execution of face recognition module 100. As such, face recognition module 100 may be capable of processing a digital image collection of any size (e.g., by processing the collection in groups of images) without using more than a pre-determined amount of system resources at any one time. The face recognition system may thus be considered "scalable."

The number of faces activated for processing as a single group by face recognition module 100 may be determined, as described above, based on available system resources. Dependent on the available system resources (or a desired use of system resources), a maximum number of faces, M, may be determined as the maximum number of faces which may be activated at any one time. The maximum number of faces, M, may represent the number of faces activated for processing as a single group by face recognition module 100. In some embodiments, a user may have an option to set the maximum number of faces M by entering a value in user interface 110 (e.g., by text box entry, drop down menu selection, etc.). Alternately, user interface 110 may provide an option for a user to specify a maximum amount of system resources (e.g. percentage of CPU usage, amount of system memory, etc.) to be used by face recognition module 100 at any one time. Face recognition module 100 may use the system resources limit specified by the user to calculate a maximum number of activated faces M.

The face activation process, indicated at 225 of FIG. 2, which may be employed by face recognition module 100, is iterative and may occur for multiple sets of faces until all of the faces within a set of digital images have been labeled. Face recognition module 100 may use the maximum number of activated faces M to determine how many faces to activate for processing and may use one or more activation rules to determine which faces in the set of digital images may be selected for processing as a group. During a first iteration of the face activation process on a set of digital images in which none of the faces have been labeled, the first set of activated faces may not include any labeled faces. For subsequent iterations of the face activation process, a set of activated faces may include one or more labeled faces. As described in further detail below, a labeled face may remain activated or may be deactivated by face recognition module 100. Deactivated faces may be labeled faces that no longer require processing, and, thus, are removed from system memory. As described in further detail below, face recognition module 100 may deactivate faces that have been labeled and subsequently activate a number of unlabeled faces such that M faces remain in the group of activated faces. Note that the last group of activated faces (e.g., all detected faces have either been labeled or activated) may contain fewer than M faces since the number of faces remaining to be labeled may be less than M.

As mentioned above, face recognition module 100 may use a number of activation rules to determine which faces in the set of digital images may be selected for processing as a group of active faces. Examples of activation rules which may be used by face recognition module 100 to select faces for activation may include, but are not limited to:

Activate faces in images that are selected by a user. For example, a user may be interacting with an digital image collection (via an application for accessing and/or managing images, such as Adobe® Photoshop Elements®, and may have selected one or more images to indicate that faces in the selected image(s) should be activated first.

Activate all faces that appear in a single image. Multiple faces that appear in the same image are not likely to be the same faces. If a set of faces that appear in a same image are activated in the same group, face recognition module 100 may easily determine that faces in the same image do not belong to the same people.

Activate faces that appear in images which have timestamps that occur within a certain span of time. A timestamp may refer to the time and/or date at which the image was captured. As an example, face recognition module 100 may activate faces which appear in images that were taken within a time span of 8 hours. As another example, face recognition module 100 may activate faces which appear in images that were taken on the same date. As described in further detail below, face recognition module 100 may combine image timestamp information with other features to calculate distances between faces. For example, face recognition module 100 may determine that faces wearing the same clothes within an eight hour time period are likely to be the same people.

Activate faces with high certainty levels. In some embodiments, the face detection algorithm used to detect faces in a set of digital images may compute a certainty level for each detected face. The certainty level computed by the face detection algorithm may indicate various parameters, such as: the likelihood that the detected region is indeed a face, the amount of image data indicating facial features in the detected region, and the quality of the image data in the detected region. As an example, face recognition module 100 may activate faces with a higher certainty levels before activating faces with lower certainty levels. Detected faces that are profiles (e.g., a sideview of a face) or are from low resolution images are examples of faces that may have low certainty levels.

Face recognition module 100 may continue to activate faces, for example by applying one or more of the above activation rules (or other activation rules), until a maximum number of faces M have been activated. Note that the number and type of activation rules applied by face recognition module 100 may vary from embodiment to embodiment and the activation rules above are presented as examples and are not meant to be limiting.

Figure 3:
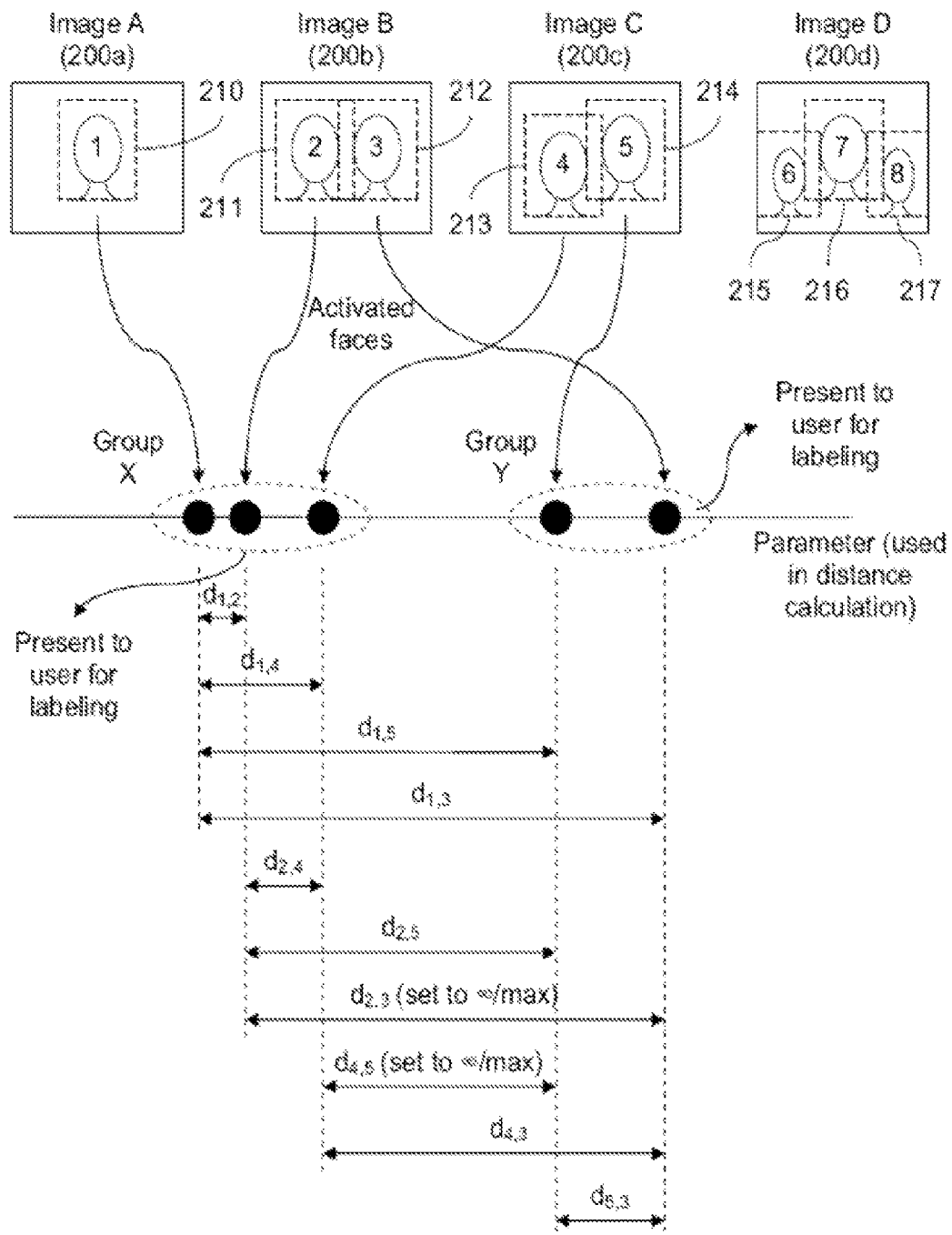
FIG. 3 illustrates an example of clusters of similar faces generated from active faces included in multiple digital images, according to some embodiments.

FIG. 3 illustrates an example embodiment of clustering active faces from multiple digital images into groups of similar faces. Digital images A-D (200a-200d) which contain active faces are shown in FIG. 3. Face detection processing may be performed on images A-D, as described above, to locate, and determine features for, faces 1-8 (210-217). Using an activation process similar to that described above, faces 1-5 from images A-C have been activated in the example illustrated in FIG. 3. Faces 6-8 in image D remain un-activated. In this example, all faces within a single image are activated such that they are included in the same processing group, as described above in the example activation rules. FIG. 3 shows, for illustrative purposes only, a maximum number of five activated faces. As described in further detail below, the activated faces illustrated in FIG. 3 may be clustered into groups, dependent on similar features (e.g., groups X and Y). Also described in further detail below, representative faces (e.g., faces 2 and 3) may be chosen from each group and presented to a user for labeling.

In some embodiments, activation of a subset of faces at 225 may begin before processing at 220 has completed for all digital images in the set of digital images. For example, activation of a subset of faces at 225 may begin after a certain percentage or number of images have completed face detection and feature determination at 220. As another example, activation of a subset of faces at 225 may begin after a certain number of faces have been detected and features for the detected faces have been determined.

The method illustrated in FIG. 2 for using contextual features to improve face recognition in digital images may include, as indicated at 230, comparing the visual and non-visual features for each pair of faces in the set of active faces. As described above, in reference to block 220 of FIG. 2, face recognition module 100 may determine visual and non-visual features which correspond to each face detected in a set of digital images. As described in further detail below, in reference to block 506 of FIG. 5, face recognition module 100 may also determine features which correspond to a detected face from a label assigned to the face. Face recognition module 100 may create, for each detected face, a feature vector (described in further detail below) which may contain values that represent the determined features which correspond to the face. In some embodiments, each element of a feature vector may correspond to a particular feature. For example, element 0 of the feature vector may correspond to eye color and may contain a value which represents the eye color of the face represented by the feature vector.

Face comparator 116 may perform a pair-wise comparison of features for each pair of faces in the set of active faces. In some embodiments, face comparator 116 may employ a classifier to perform the feature vector comparison. The classifier may perform the feature comparison for a pair of faces by comparing corresponding elements of the feature vectors which represent the features of the pair of faces. For example, the classifier may compare the elements of the feature vectors representing eye color to determine whether two faces have the same eye color. The classifier may compare all of the features included in the feature vectors of the faces and may calculate a value which represents the comparison of each feature. For example, the classifier may define a comparison scale ranging between zero and one which represents the comparison of a feature between a pair of faces and indicates how similar (or, dissimilar) the feature is between the pair of faces. A value of zero may indicate that the features are not a match and a value of one may indicate that the features are an exact match. A value between zero and one may indicate that the features are similar, but may not be an exact match. Such examples of comparison values determined by a classifier are provided as examples only, and are not intended to be limiting in any manner. In various embodiments, the classifier used by face comparator 116 may use a variety of methods for comparing the feature vectors of a pair of faces.

In some instances, some of the features of a feature vector may be missing, or may not contain enough information to provide an accurate comparison. For example, an image of a face may be a profile of the face, which may prevent an accurate determination of some visual facial features such as eye color, distance between eyes, and/or width of the face. As another example, the presence of sunglasses on a face may hide visual facial features such as eye color and distance between eyes. In some instances, contextual features may be missing from a feature vector because the contextual features cannot be inferred from the image data. For example, the gender of a face may be inferred from facial structure and the length/shape of the hair attached to the face. However, if a person's hair is gathered behind the head, as in a ponytail, and the person is wearing sunglasses (which may likely obscure facial structure), the person's gender may not be accurately determined from an image of the person's face. In such cases where features are missing from a feature vector, or are inadequate for a feature comparison, the classifier may not include the missing or inadequate features in the feature vector comparison for the pair of faces.

The classifier may be configured to determine whether a feature comparison is appropriate, based on the value of another feature. For example, the classifier may determine whether to compare the clothes features for two people dependent on the difference in the timestamps associated with the images that contain the two people. More specifically, in such an example, the classifier may only compare the clothes features for two people if the difference between the timestamps of the images containing the people is less than twelve hours. The twelve hour criteria in this example may be based on an assumption that people are not likely to be wearing the same set of clothes after a twelve hour period. As another example, the classifier may only compare the hair features for two people if the difference between the timestamps of the images that contain the two people is less than eight weeks. In such as example, the eight week criteria may be based on an assumption that a person is not likely to have the same type of hair style after a period of eight weeks. Note that the feature comparison examples and criteria for feature comparisons described above are presented as examples and are not meant to be limiting. The numbers and types of feature comparisons executed by a classifier, and the criteria that may be used by the classifier for such comparisons may vary from embodiment to embodiment.

In various embodiments, face comparator 116 may perform feature vector comparisons using a variety of different types of classifiers. For example, face comparator 116 may use a support vector machine (SVM) classifier or a logistic regression classifier. In other embodiments, face comparator 116 may employ other types of classifiers. The classifier used by face comparator 116 may be trained to correctly analyze and compare visual and non-visual features of people for which faces are detected in a set of digital images. The classifier may be trained using both positive and negative exercises. For example, as a positive exercise, a classifier may be provided feature vectors for two faces along with information that the faces are the same. As an example of a negative exercise, a classifier may be provided feature vectors for two faces along with information that the faces are not the same. Using a large number of various examples of comparisons, a classifier may be trained to make an accurate comparison of two faces. In some embodiments, the accuracy of the classifier may increase as the number of training exercises increases. A classifier may also be trained to rely on other features if certain features are missing from a feature vector, or are inadequate for comparison purposes. For example, a classifier may be trained to recognize that a comparison of eye color between two faces is not accurate if one of the faces has sunglasses obscuring the color of the eyes on one or both of the two faces.

As indicated at 235, the method illustrated in FIG. 2 may include calculating a distance for each pair of faces in the set of active faces. Face comparator 116 may calculate the distance between a pair of faces based on the feature vector comparison described at 230. A distance between two faces may indicate a measure of similarity (or, dissimilarity) between the two faces. A smaller distance between two faces may correspond to a strong similarity between the two faces and a larger distance between two faces may correspond to a lesser similarity between the two faces. A distance between two faces may also indicate a likelihood that the two faces belong to the same person. A smaller distance between two faces may indicate that the faces are likely to belong to the same person, whereas a larger distance between two faces may indicate that the faces are likely to belong to different people. The distance between two faces, $face_i$ and $face_j$ may be represented as $d_{i,j}$. In some embodiments, the distance between $face_i$ and $face_j$ ($d_{ij}$) and the distance between $face_j$ and $face_i$ ($d_{ji}$) may be represented as a symmetrical function: $d_{i,j}=d_{j,i}$.

Face comparator 116 may calculate the distance between a pair of faces based on the comparison of the feature vectors which correspond to the two faces. Dependent on the visual and non-visual features determined for a pair of faces, face comparator 116 may calculate one or more distance values for the pair of faces. For example, face comparator 116 may calculate a facial distance, a clothes distance, a gender distance, and/or a timestamp distance between a pair of faces. As described above, it may not be possible to determine all possible visual and non-visual features for a person depicted in an image. For example, eye color may be obscured by sunglasses on a face and hair color may be obscured by a hat. Face comparator 116 may calculate certain distance values dependent on the visual and non-visual features that have been determined. For example, face comparator 116 may calculate a facial distance between a pair of faces when all facial features are available for both faces. In other embodiments, face comparator 116 may be configured to use a partial feature set to calculate a distance when all features are not available.

As an example, face comparator 116 may calculate a facial distance ($d_{f_{ij}}$) between a pair of faces (i,j). Face comparator 116 may calculate the facial distance by determining a Euclidean distance between face vector, $face_i$, and face vector, $face_j$. Face vectors $face_i$ and $face_j$ may each be a subset of the feature vectors for respective faces (i,j), and may contain vector elements which represent facial features. Face comparator 116 may calculate the Euclidean distance between $face_i$ and $face_j$ using equation 3:

$$df_{ij} = \sqrt{\sum_{k=1}^{n} (x_{ik} - x_{jk})^2} \quad (3)$$

where $x_{ik}$ is the k-th dimension of the vector $face_i$ and $x_{jk}$ is the k-th dimension of the vector $face_j$.

As another example, face comparator 116 may calculate a clothes distance ($d_{c_{ij}}$) between the pair of faces (i,j). Face comparator 116 may calculate the clothes distance by determining a Euclidean distance between clothes vectors $clothes_i$ and $clothes_j$. Clothes vectors $clothes_i$ and $clothes_j$ may each be a subset of the feature vectors for respective faces (i,j), and may contain vector elements which represent clothes features. Face comparator 116 may calculate the Euclidean distance between $clothes_i$ and $clothes_j$ using equation 4, where $x_{ik}$ is the k-th dimension of the vector $clothes_i$ and $x_{jk}$ is the k-th dimension of the vector $clothes_j$.

$$dc_{ij} = \sqrt{\sum_{k=1}^{n} (x_{ik} - x_{jk})^2} \quad (4)$$

As yet another example, face comparator 116 may calculate a gender distance ($d_{g_{ij}}$) between the pair of faces (i,j). As described in further detail below, in reference to 415 of FIG.

4, a gender feature may be calculated for each face. The gender feature may be a scalar which represents a probability that the face is a male or a female. Face comparator 116 may calculate a gender distance ($d_{gij}$) between $gender_i$, ($g_i$), and $gender_j$, ($g_j$). Face comparator 116 may use equation 5 to calculate gender distance ($d_{gij}$) by determining the absolute difference between gender features $gender_i$ and $gender_j$.

$$dg_{ij}=|g_i-g_j| \quad (5)$$

Face comparator 116 may determine a combined distance ($dp_{ij}$) between $face_i$ and $face_j$ (e.g., a distance between the people represented by $face_i$ and $face_j$), by combining the distance values that have been calculated for $face_i$ and $face_j$ (e.g., facial distance, clothes distance, gender distance). A variety of distance values may be calculated for different pairs of faces, dependent on the features that may have been determined for the faces, as described above. For example, face comparator 116 may calculate face and gender distance values for one pair of faces and face comparator 116 may calculate face, clothes and gender distance values for a different pair of faces. As described in further detail below, the distance between pairs of faces may be compared such that the faces may be clustered into groups of similar faces. Accordingly, each distance value between each pair of faces may need to be computed on a similar scale to enable accurate comparisons between combined distance values for different pairs of faces. To establish a similar scale for the combined distance values calculated for pairs of faces, face comparator 116 may apply coefficients to the distance values when calculating the combined distance value. For example, face comparator 116 may calculate an combined distance value for a pair of faces using equation 6.

$$dp_{ij} = \frac{1}{1+e^{-(c_0+c_1 d_1+c_2 d_2+\ldots+c_m d_m)}} \quad (6)$$

In equation 6, $d_1, d_2, \ldots$, and $d_m$, represent distance values that have been calculated, as described above, between a pair of faces. For example, $d_1$ may represent a facial distance, $d_2$ may represent a clothes distance and $d_m$ may represent a gender distance. In equation 6, $c_0, c_1, c_2, \ldots$, and $c_m$ represent various coefficients which may be used to establish a scale for the combined distance value such that combined distance values may be accurately compared for different pairs of faces. The coefficients used in equation 6 may be determined dependent on which distance values, $d_1, d_2, \ldots$, and $d_m$, are calculated for a pair of faces.

Face comparator 116 may use a variety of different combinations of distance values to calculate a combined distance between a pair of faces. The following is an example of the various combinations of distance values that may be used in equation 6 to calculate an overall distance value:
 (1) face only
 (2) clothes only
 (3) face+clothes
 (4) face+gender
 (5) clothes+gender
 (6) face+clothes+gender
 (7) face+gender+time stamp
 (8) clothes+time stamp
 (9) face+clothes+gender+time stamp The set of coefficients, $c_0, c_1, c_2, \ldots$, and $c_m$, which may be used in equation 6, may be dependent on the particular combination of distance values that have been calculated for a pair of faces. For example, the set of coefficients may be dependent on which of the above combinations, (1)-(9) above, of distance values have been calculated for the pair of faces. The coefficients of equation 6 may provide a cumulative distance value, ($dp_{ij}$), that remains on a same scale, regardless of which distance values $d_1, d_2, \ldots$, and $d_m$, are used to calculate the combined distance.

The set of coefficients for each combination of distance values may be pre-determined using a trained classifier. Examples of classifiers that may be trained to determine the coefficient values are logistic regression classifiers, and/or SVM classifiers. The classifier may be trained using positive and negative examples of visual and non-visual features of faces depicted in images, as described above. A separate classifier may be trained to determine the coefficient for each of the distance value combinations listed above. Face comparator 116 may determine the appropriate set of coefficients, dependent on the combination of feature distance values calculated, and may use the coefficients and feature distance values, as shown in equation 6, to determine an overall distance between a pair of faces.

Figure 7:
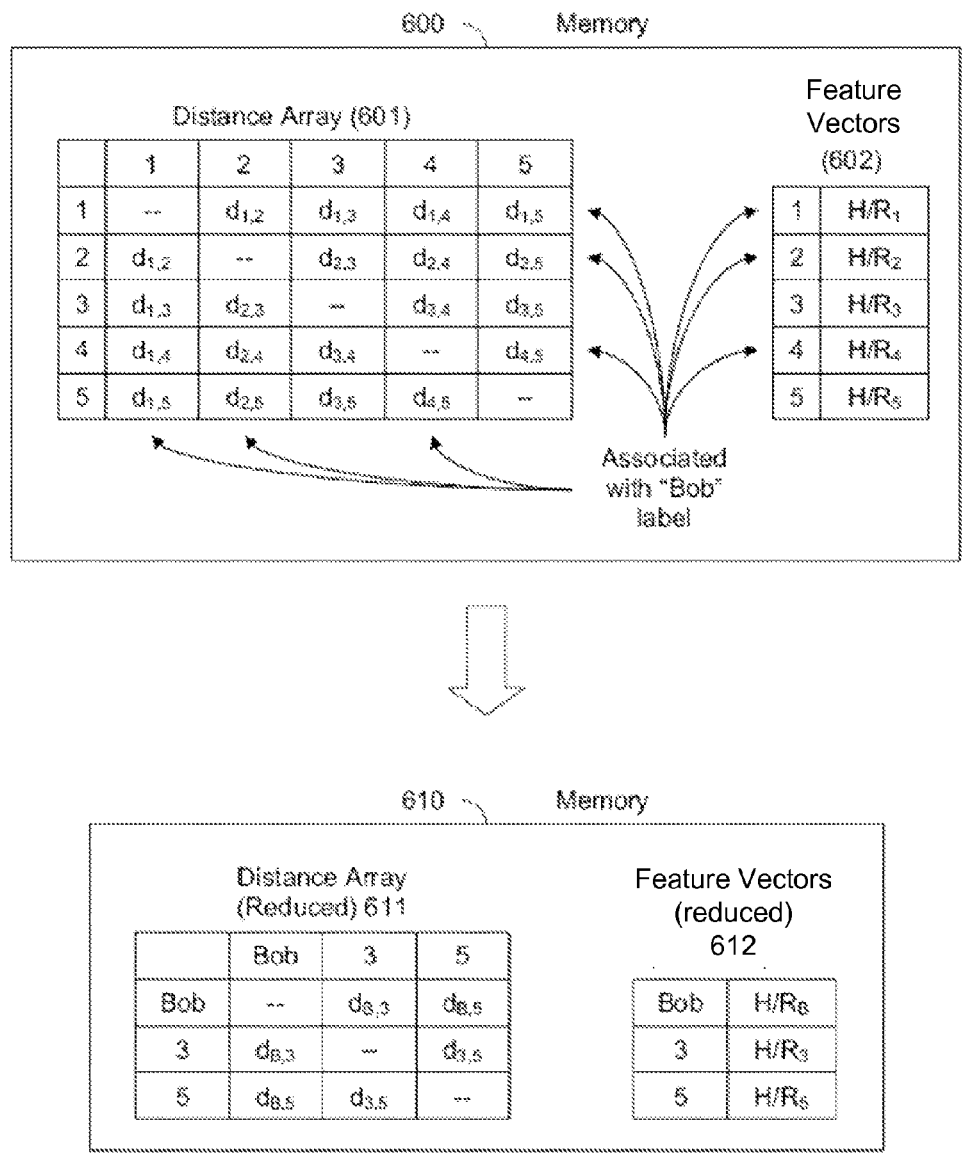
FIG. 7 illustrates a reduction in system memory use due to the deactivation of labeled faces, according to some embodiments.

Face comparator 116 may store, in system memory, the calculated distances for each pair of active faces. FIG. 7 illustrates an example of a distance array 601 storing calculated distance values for faces 1-5 in system memory 600. As shown in the example illustrated in FIG. 7, distance array 601 may be an array that stores the respective distances between pairs of faces that are active. In this example, faces 1-5 are active and therefore distance array 601 is a 5×5 array. As shown in the example, distance array 601 is symmetrical along the diagonal (e.g. the distance values along the diagonal are not applicable), so it may not be necessary to maintain an entire 5×5 array. Information stored in distance array 601 may be updated as appropriate. For example, if the distance between two faces is set to infinity or a maximum value (e.g., because the faces are from the same image) the corresponding distances in array 601 are updated. Distance array 601 is presented as an example data structure and is not meant to be limiting. The face recognition system may implement different types of data structures in different embodiments.

As indicated at 240, the method illustrated in FIG. 2, may include assigning labels to one or more of the set of active faces. A label assigned to a face may be, for example, a name associated with the face. Face recognition module 100 may specify that there is at most one face associated with a given label within a set of digital images. More specifically, if there are two different people named "Bob" in a set of digital images, face recognition module 100 may require unique labels for the face of each person (e.g., "Bob B" and "Bob A"). As described in further detail below, in reference to FIG. 5, face labeler 118 may form groups, or clusters, of similar faces from the set of active faces. The clusters formed by face labeler 118 may be dependent on the distances calculated between each pair of faces in the set of active faces, as described above in reference (e.g. block 235 of FIG. 2). The clustering algorithms which may be used by face labeler 118 to group the active faces into clusters of similar faces is described in further detail below.

Face labeler 118 may assign labels to one or more of the active faces. As described in further detail below, face labeler 118 may present to a user, via user interface 110, one or more representative faces from each cluster of faces. The user may indicate, via user interface 110, appropriate labels for the representative faces. Face labeler 118 may use the labels indicated by the user for the representative faces of each cluster to present suggested labels for the other faces of the cluster. The user, via user interface 110, may provide feedback on the labels suggested by face labeler 118. For each face for which the user has provided positive feedback that the suggested label is correct, face labeler 118 may assign the suggested label to the face. The remaining faces, e.g. the faces for which the user has provided negative feedback indicating that the suggested label is incorrect, remain unlabeled. As described in further detail below, these remaining faces will be re-clustered, if necessary, and compared to a different labeled face in a next iteration of the face labeling process. Further details of the method indicated at 240 are described below in reference to FIG. 5.

As indicated at 245, the method illustrated in FIG. 2 may include deactivating at least one of the labeled faces. Face recognition module 100 may deactivate one or more of the faces labeled at block 240 of FIG. 2. As described above, the face recognition system may be scalable, such that a predetermined, limited amount of system resources are used at any one time for labeling faces in a set of digital images, regardless of the number of faces in the set of digital images. Processing a predetermined number of active faces (e.g., a subset of the faces in the set of digital images) for labeling may enable the face recognition system to be scalable. After one or more active faces receive labels, at least one of the labeled faces may be deactivated such that additional, unactive faces may be activated, and, thus, added to the group of active faces. As described in further detail below, in reference to FIG. 7, deactivating a labeled face may reduce the use of system memory, as the size of the distance array stored in system memory may be reduced when faces are deactivated.

Face recognition module 100 may deactivate faces which share the same label. For example, three faces may have been assigned the label "Bob," indicating that the faces belong to the same person. Face recognition module 100 may deactivate two of the faces labeled "Bob" and leave only one active face with a label of "Bob." When a single labeled face is left active, face recognition module 100 may create a composite feature vector for the remaining active face. As described in further detail below, the composite feature vector may be a combination of the features stored for all of the faces labeled "Bob." In other embodiments, face recognition module 100 may only deactivate one of the faces labeled "Bob."

The face recognition system may execute multiple iterations of the method illustrated in FIG. 2 until all of the faces in the set of digital images are labeled. Subsequent to deactivating at least one active face, as in 245, face recognition module 100 may determine whether any unlabeled faces remain in the set of digital images. If unlabeled faces remain in the set of digital images, face recognition module 100 may repeat blocks 225 through 245 of FIG. 2 to activate and label more faces in the set of digital images. At block 225, face recognition module 100 may activate a number of inactive faces. The number of activated faces may be dependent on the number of faces previously deactivated during the prior execution of block 245 and the maximum number of active faces, M. For example, if the maximum number of active faces is five and three faces were deactivated, face recognition module may activate two of the unactive faces. In such an example, the number of active faces is maintained at five active faces. In this manner, face recognition module maintains a maximum number of active faces M (as described above) which may consume a predetermined, limited amount of resources when processed for labeling by the scalable face recognition system.

Face recognition module 100 may repeat the execution of blocks 230 through 245 on the new set of active faces. For example, face comparator 116 may compare the features of the newly active faces against the existing active faces and create a distance value for each pair of faces containing a newly active face and an existing active face. Face comparator may update distance array 601 to include the newly active faces and the new calculated distances. In some embodiments, calculated distances may only be determined for pairs of faces containing the newly activated faces. Distances between previously existing activated faces may have already been calculated, and, therefore, may not be repeated. In various embodiments, some of the method elements shown in FIG. 2 may be performed concurrently, in a different order than shown, or may be omitted. Additional method elements may also be performed as desired.

Subsequent to labeling all of the faces in the set of digital images, face recognition module 100 may generate as output a labeled digital image collection (e.g., collection 140 in FIG. 1), with each face in the collection associated with a label. Labeled digital image collection 140 may, for example, be stored in a storage medium such as system memory, a disk drive, DVD, CD, etc. (e.g., storage medium 150 in FIG. 1), and/or displayed to the user on a display (e.g., display 160 in FIG. 1).

Determine Visual and Non-Visual Features

Figure 4:
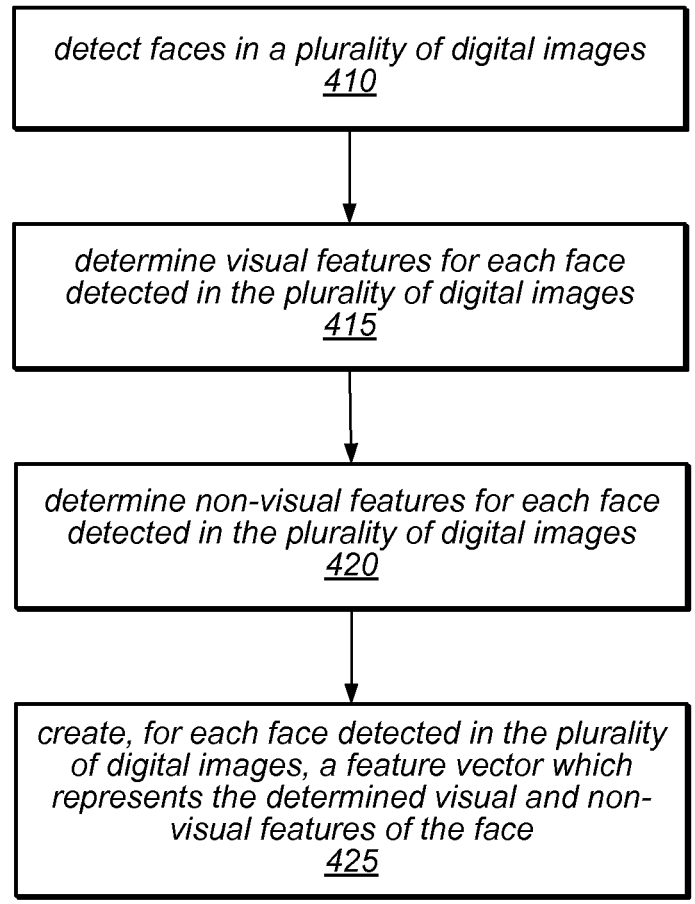
FIG. 4 is a flowchart of a method for determining visual and non-visual features for faces in digital images, according to some embodiments.

As described above, in reference to block 220 of FIG. 2, face recognition module 100 may determine, for each of the faces in a set of digital images, visual and non-visual features. FIG. 4 illustrates a method that may be used by face recognition module 100 to determine such visual and non-visual features for faces that appear in a set of digital images, such as digital image collection 130. In various embodiments, some of the method elements shown in FIG. 4 may be performed concurrently, in a different order than shown, or may be omitted. Additional method elements may also be performed as desired.

As illustrated at 410 of FIG. 4, face recognition module 100 may detect faces in the set of digital images. The detection of faces may be performed by face detector 112 of face recognition module 100. In various embodiments, face detector 112 may use a variety of techniques to detect faces in a set of digital images. For example, face detector 112 may employ a trained classifier to identify regions or portions of a digital image that may correspond to a face depicted in the digital image. The classifier may operate using a set of rules which may distinguish a face from other objects in a digital image. The rules may, for example, specify light and dark areas that may be expected to appear in a certain pattern in a human face. As a specific example, one rule used by the classifier may expect that the area immediately surrounding a set of eyes is typically darker than the area between the set of eyes. Another rule may state that the area depicting a mouth is typically darker than the area below the mouth. The set of rules may specify characteristics which are more likely to be true for faces in an image than for other objects in an image. The classifier used by face detector 112 may analyze a digital image to locate regions which adhere to the rules for face recognition. The classifier may determine that regions of the digital image for which a certain number of rules are satisfied are regions which include a face.

In some embodiments, the face detection algorithm used to detect faces in a set of digital images may compute a certainty level for each detected face. The certainty level computed by the face detection algorithm may indicate various parameters, such as: the likelihood that the detected region is indeed a face, the amount of image data indicating facial features in the detected region, and the quality of the image data in the detected region. In various embodiments, a variety of techniques may be used by face detector 112 to detect faces in a set of digital images. Note that the example described above, for using a trained classifier to detect faces in digital images, is presented only as an example and is not meant to be limiting. Other embodiments of the face recognition system may use different methods for detecting faces in a set of digital images. Some specific examples of techniques that may be used by the face recognition system may include, but are not limited to: facial patterns defined by Eigenfaces, Adaboost classifier training algorithms, and neural network-based face detection algorithms.

In some embodiments, face recognition module 100 may perform the face detection process as a background task. For example, as resources (e.g., CPU, memory, etc.) of the system within which face recognition module 100 is executing become available, the face recognition module may instruct face detector 112 to execute the process of detecting faces in the digital album. As system resources are needed by other applications and/or tasks executing on the system, the face recognition module may instruct face detector 112 to pause the face detection process. In response, face detector 112 may temporarily stop the face detection process and may save an indicator specifying the location within the digital image collection at which face detection was stopped. Face detector 112 may use this indicator to resume face detection at a correct location in the digital image collection when instructed by the face recognition module to continue detecting faces within the digital image collection, for example, when system resources again become available for use by face recognition module 100.

Face recognition module 100 may continuously monitor a digital image collection for new images and may automatically execute the face detection process for any new images added to the digital image collection. For example, each time one or more new images are added to the digital image collection, face recognition module 100 may automatically instruct face detector 112 to detect the faces which appear in the new images. The newly detected faces may then be added to the set of detected faces for the digital image collection. User interface 110 of face recognition module 100 may provide options (e.g. checkboxes or other appropriate selection options) for a user to enable background processing of face detection in a digital image collection and/or automatic face detection for new images that are added to the digital image collection.

In some embodiments, a user may also choose an option (or such an option may be the default operation of the face recognition module) to execute face detection on a digital image collection as a foreground process which executes until all faces in the album have been detected. For example, a user may select, via user interface 110, a digital image collection and may instruct the face recognition module to begin the face detection process with the digital image collection (e.g. by choosing a "Start Face Detection" option within user interface 110). The user may then select an option in user interface 110 to automatically detect faces in new images added to the digital image collection. Face recognition module 100, in response to this selection, may monitor the specified digital image collection and automatically detect faces for new images added to the collection, as described above. As an alternative, the user may indicate, via user interface 110, that face detection for new images in a digital image collection will be executed manually. In this case, detecting faces in new images added to the digital image collection may occur as manually directed by the user, for example, via user selection of "Start Face Detection" option in user interface 110 of face recognition module 100.

The method illustrated by FIG. 4, as shown at 415, may include determining visual features for each face detected in a set of digital images. Feature extractor 114 of face recognition module 100 may analyze the image data (e.g., pixel data) of an image to determine visual features of faces that appear in the image. For example, pixel color may be used to determine skin tone and/or eye color for a face. Visual features may be a variety of facial features that represent the characteristics of a face which appears in a digital image. Examples of visual, facial features that may be determined from image data of a digital image may include, but are not limited to: skin tone, eye color, presence of facial hair and biometric parameters which may indicate the structure of a face (e.g., width of face, distance between eyes, nose shape and size, mouth shape and size).

Feature extractor 114 may determine visual, contextual features from the image data (e.g., the pixel data) of a digital image. Contextual features may be non-facial features that represent the characteristics of a person in a digital image. For example, contextual features may be hair features (e.g., color and/or shape), clothes features (e.g., color, texture and/or type), headwear (e.g., hats), jewelry (e.g., necklace, earrings), and sunglasses (e.g. color, size, type). For simplicity, contextual features may be referenced herein as "features for a face," or "features corresponding to a face." Although contextual features may not be features that directly represent the characteristics of a face, the contextual features may directly correspond to the face, as the contextual features represent the characteristics of a person represented by a face. Contextual features may provide additional cues that may be used by the face recognition system to recognize faces in digital images. For example, the face recognition system may be able to more accurately distinguish between two faces with similar facial features by comparing contextual features which correspond to the faces, such as clothing, headwear, jewelry, and/or others.

Feature extractor 114 may infer additional contextual features by analyzing and/or classifying the facial and/or contextual features extracted from the image data of a digital image. For example, feature extractor 114 may determine the gender, race and/or age of a face from facial and/or contextual features such as facial structure, presence of facial hair, length of hair, presence of jewelry, and/or type of clothes. More specifically, as an example, feature extractor 114 may determine that a person with long hair, two earrings and a dress is likely a female and a person with a beard is likely a male. As another example, feature extractor 114 may determine a person's race from the skin color of the person's face. As yet another example, feature extractor 114 may determine a person's age from the characteristics of the person's skin (e.g., presence of wrinkles) and, possibly, the shape or structure of the person's hair.

Feature extractor 114 may determine a gender feature for a face, which may be a scalar which represents the probability that the face is a male or female face. Feature extractor 114 may extract the gender feature for a face from one or more features of the face, for example: name (e.g., a label assigned to the face), facial features, and/or name and facial features. A classifier, such as a logistic regression classifier, may be trained to determine the gender feature from the name and/or facial features of a face.

The face recognition system may train a classifier to determine contextual features from other facial and/or contextual features. The classifier may be trained to associate particular features with classifications such as gender, race and age. For example, the classifier may be trained to associate features such as presence of a dress, presence of two earrings, a small facial structure with a female face. As another example, the classifier may be trained to associate features such as a larger facial structure and presence of facial hair with a male face.

The classifier may be trained to more accurately classify a face by considering multiple facial and/or contextual features. In some instances, certain features may not be available, such as when facial structure is obscured by the presence of sunglasses or when the image of the face is a profile view. In such instances, the classifier may still be able to provide an accurate classification by considering other features that are available.

As described above, feature extractor 114 may determine facial and contextual features from the image data (e.g., pixel data) of a digital image. As an example, feature extractor 114 may determine various features of a person's upper and lower clothing by analyzing the image data of a digital image. Some examples of clothing features that may be determined from the image data are color, type of clothing (e.g., pants or skirt, short or long sleeve shirt) and the texture of the material (e.g., rough or smooth). Feature extractor 114 may be configured to determine such clothing features by locating and analyzing a region of a digital image that is a certain distance from the face of the person in the digital image. Feature extractor 114 may be configured to recognize certain features that are a pre-determined distance from a face. For example, feature extractor 114 may extract the color histogram of the pixels in an image region above the face to determine the color of a person's hair.

The method illustrated by FIG. 4, as shown at 420, may include determining contextual, non-visual features for each face detected in a set of digital images. Feature extractor 114 of face recognition module 100 may analyze data associated with an image that is separate from the image data (e.g., pixel data) contained within the image. For example, feature extractor 114 may analyze the timestamp, location (e.g. geotag), name, and/or tags associated with a digital image to determine contextual, non-visual features that correspond to each face within the digital image. The non-visual, contextual features may serve as contextual cues which may help identify faces in digital images. For example, the timestamps and locations of two digital images may determine whether the same people may exist in both of the digital images. In such an example, if the locations of the two digital images are different and the difference between the time stamps is below a certain threshold (e.g., lower than the time required two travel between the two locations), then the two digital images must contain different people. More specifically, if the location of one image is New York, the location of the other image is Los Angeles and the difference in timestamps between the images is two hours, then the images must contain different people because it is not possible for a person to be in New York and Los Angeles within a two hour period.

Names or tags associated with a digital image may be contextual, non-visual features which correspond to the faces in the digital image. Feature extractor 114 may determine the names or tags associated with a digital image such that the names or tags may be used, along with other features, to identify the faces which appear in the digital image. As a specific example, two digital images, each with a single face, with one image named "Susan" and the other image named "Ellen" are very unlikely to contain the face of the same person. If the faces of Susan and Ellen have similar visual features in the two digital images, the contextual feature of the names of the digital images may be an important feature which distinguishes the faces as belonging to two different people.

Non-visual, contextual features may be used to determine the relative importance of other visual features when two faces are compared to determine whether the faces belong to the same person. For example, the timestamps associated with two digital images may determine whether the clothes of the people in the two digital images may be an accurate indicator of whether the same people appear in the two digital images. If the difference between the timestamps is greater than twelve hours, for example, then the clothes of the people may not be an accurate indicator, as people are not likely to wear the same set of clothes for longer than a twelve hour time period.

The method illustrated by FIG. 4, as shown at 425, may include creating, for each detected face in the set of digital images, a feature vector which represents the determined visual and non-visual features which correspond to the face. Feature extractor 114 of face recognition module 100 may create a feature vector for each face which includes all determined visual and non-visual features which correspond to the face. A feature vector for a face may be a collection of elements, with each element containing a value that represents a feature of the face. For each feature determined for a face, feature extractor 114 may create a software-recognizable representation of the value of the feature and associate the representation with the vector element designated for the feature. As an example, element 0 of the feature vector may be designated to represent the skin color of a face. Feature extractor 114 may store the RGB color value determined for the skin of a face in element 0 of the feature vector for the face. In some embodiments, a feature vector may be implemented as a software data structure, such as an array, with each element of the vector identified by one or more integer indices. In other embodiments, a feature vector may be implemented as other types of data structures.

Label Faces in Digital Images

Figure 5:
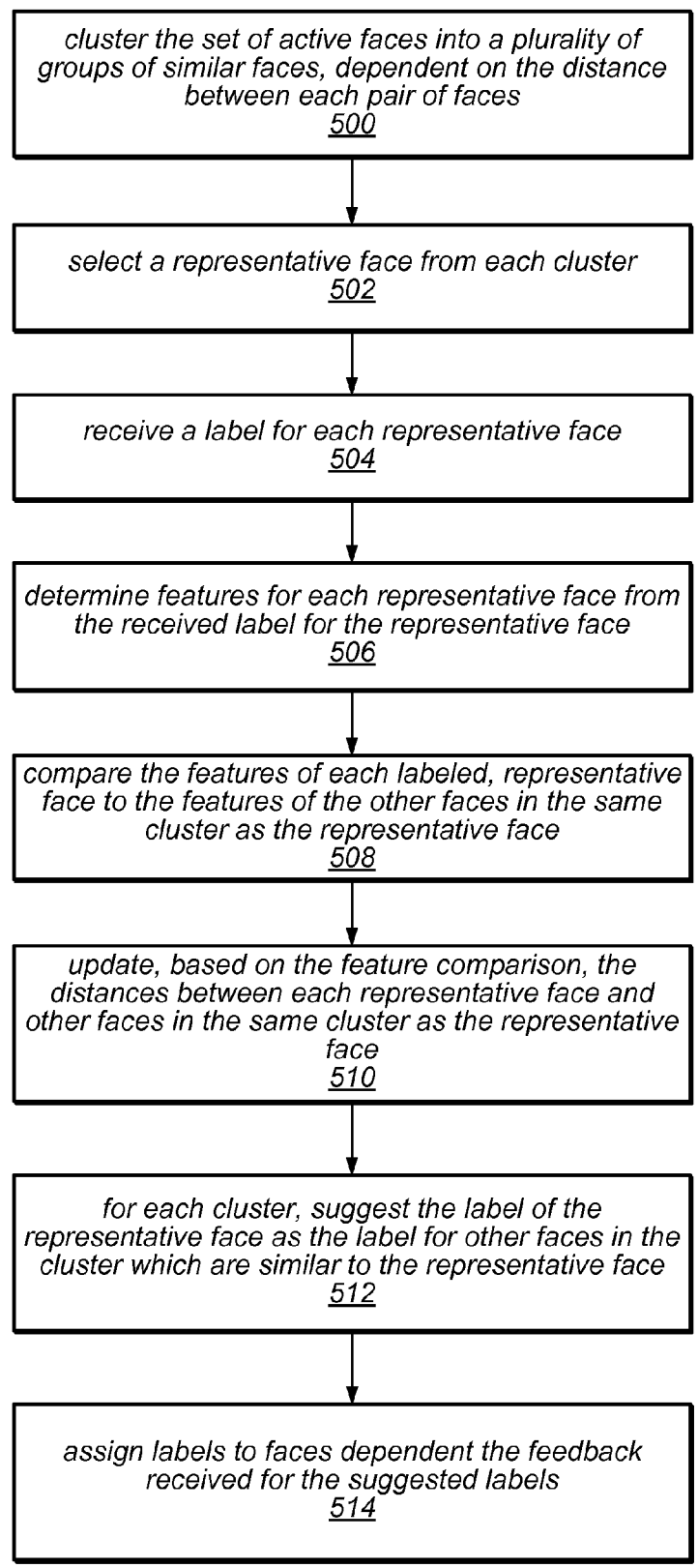
FIG. 5 is a flowchart of a method for labeling faces that appear in digital images, according to some embodiments.

FIG. 5 is a flowchart of a general method for labeling faces that appear in digital images. The method illustrated in FIG. 5 may be implemented by face labeler 118 of face recognition module 100 to label the faces that appear in a set of digital images, such as digital image collection 130. The method illustrated in FIG. 5, which is a detailed representation of the process indicated at 240 of FIG. 2, may be repeated for each set of active faces. As indicated at 500 of FIG. 5, the active faces may be clustered into a plurality of groups dependent on the distance calculated between each pair. The groups, or clusters, of active faces may have similar features, as represented by the distance calculated by face comparator 116 (described above in reference to 235 of FIG. 2). During a first iteration of the method of FIG. 5 (e.g., before any faces in the set of digital images have been labeled), the clusters of active faces may not include any labeled faces. During subsequent iterations of the method of FIG. 5 (e.g., after some faces have been labeled and remain active), the clusters of active faces may include labeled faces. In various embodiments, some of the method elements shown in FIG. 5 may be performed concurrently, in a different order than shown, or may be omitted. Additional method elements may also be performed as desired.

In various embodiments, face labeler 118 may use different clustering algorithms to separate the active faces into clusters of similar faces. For example, face labeler 118 may perform agglomerative clustering, in which each face may begin in a separate cluster. The most similar pairs of clusters may be identified and merged. The process of identifying and merging the most similar pairs of clusters may be repeated until the distance between the most similar pair of clusters exceeds a threshold T. Alternatively, in some embodiments the process of merging similar clusters may be repeated until a fixed number of clusters are obtained. For example, similar clusters may be identified and merged until five different clusters are obtained.

A distance between two clusters may be defined as a distance between the closest faces within the two clusters, which otherwise may be referred to as simple linkage. To determine the simple linkage between two clusters, face labeler 118 may analyze all pairs of faces within the clusters (e.g. a pair contains a face from each of the clusters) to find the shortest calculated distance between a pair of faces. The shortest distance between the pair may be the distance between the two clusters, e.g., the simple linkage of the two clusters. In alternative embodiments, the distance between two clusters may be defined as the distance between the average face in each cluster, or the maximum distance between any two faces in the clusters. In some embodiments, the clustering algorithm may require $O(N^3)$ calculations for completion, where N is the number of faces. In other embodiments, the clustering algorithm may require $O(N^2 \log N)$ calculations for completion.

FIG. 3 illustrates an example of clustering active faces. As shown in FIG. 3, active faces 1-5 (210-214) may be clustered into two groups: group X consisting of faces 1, 2, and 4 (210, 211, and 213) and group Y consisting of faces 3 and 5 (212 and 214). In this example, the faces may be clustered into groups based on a calculated distance between faces, similarly as described above. For simplicity, and to illustrate the techniques described herein, the calculated distance between each pair of faces may be determined based on a single parameter or heuristic (e.g., feature) of the faces and the faces may be represented as points along a single axis. As described above, face comparator 116 may use two or more, or all of, the parameters or heuristics (e.g., features) that correspond to faces in a pair of faces to calculate a distance between the pair of faces.

In the example illustrated in FIG. 3, a face may be clustered into a group if the distance between the face and the closest member of the group is less than a particular threshold. For example, if the distance between face 4 and face 4's closest neighbor in group X (e.g., face 2 (211)) is less than a particular threshold, then face 4 may be added to group X. Specifically, face 4 may be added to group X if the distance between face 4 and face 2 is below a particular threshold, e.g. if $d_{2,4}$<threshold T. In such an example, if the distances between face 4 and the closest neighbor of two different groups both fall below the particular threshold, face 4 may be added to the group which contains the neighbor having the closest distance to face 4. Since two faces in a same digital image are very unlikely to belong to the same person, the distance between the two faces may be set to infinity or a maximum value. For example, the distance between faces 2 and 3 (e.g., $d_{2,3}$) and between faces 4 and 5 (e.g., $d_{4,5}$) may be set to infinity or a maximum distance value. In some embodiments, this infinite or maximum distance value may prevent two faces in the same image from being clustered together in the same group.

As described above, the set of active faces may include some labeled faces after the first iteration of FIG. 2. Face labeler 118 may employ additional clustering rules when the set of active faces includes labeled faces. For example, face labeler 118 may specify that a label may be associated with at most one cluster of faces. More specifically, face labeler 118 may not create two clusters in which each cluster includes a face labeled "Susan." As another example, face labeler 118 may specify that a given cluster contains faces which are labeled with at most one label. More specifically, face labeler 118 may create a cluster in which two faces have the same label; for example, a cluster may contain two faces labeled "Bob." However, face labeler 118 may not create a cluster in which two faces have different labels; for example, a cluster may not contain a face labeled "Susan" and a face labeled "Jane." As yet another example, face labeler 118 may specify that a cluster of faces may include only one labeled face. In various embodiments, face labeler 118 may employ individual rules, or a combination of rules for clustering active faces into groups of similar faces. The examples for clustering active faces which include labeled faces are presented above as examples only and are not meant to be limiting in any manner. In some embodiments, after initial clusters of similar active faces have been formed, face labeler 118 may simply add newly activated faces to existing clusters, as appropriate. In other embodiments, face labeler 118 may re-cluster the entire group of active faces when new faces are activated.

As indicated at 502 of FIG. 5, the method illustrated in FIG. 5 may include selecting a representative face from each cluster. For example, if three clusters of similar faces are created at 500, at least one face from each of the three clusters may be selected to be the representative face for that cluster. In some embodiments, the center face, or centroid element, of a cluster may be selected as the cluster's representative face. The centroid element of a cluster may be the face with features having values closest to the center of the range of feature values.

FIG. 3 illustrates an example of representative faces chosen from clusters of similar faces, where face 2 has been selected as the representative face for Group X. As illustrated in FIG. 3, face 2 is the centroid element of Group X when the faces of Group X are plotted along a single axis corresponding to the parameter (e.g., feature) that is used for the distance calculations. As described above, FIG. 3, for simplicity, illustrates only a single parameter used for a distance calculation. Face comparator 116 may use multiple parameters to calculate a distance between a pair of faces. When multiple parameters are used for the distance calculation, the axis shown in FIG. 3 may be multi-dimensional, with each axis corresponding to a feature. In this case, the centroid element of a cluster, Group X, for example, may be the face which is closest to the intersection of the multiple axes. In some embodiments, more than one representative face may be selected from a cluster of similar faces.

As illustrated in FIG. 3, Group Y contains faces 3 and 5. Either face 3 or face 5 may be selected as the representative face for Group Y. In some embodiments, when only two faces exist in a cluster, the face with feature value(s) which are closest to the center of the range of feature values may be chosen as the representative face. In other embodiments, a quality and/or certainty value as described above may be used to select a representative face. For example, the face with the higher certainty value may be chosen as the representative face for the cluster. In some embodiments, a quality and/or certainty value may be used as a tie-breaker between two candidate faces (e.g., if there are only two faces in a group or if there is an even number of faces in a group and two faces are equally close to a centroid). In the example illustrated in FIG. 3, face 3 (212) is selected as the representative face.

As described above, the process of selecting active faces and labeling the active faces may be repeated until all of the faces in a set of digital images are labeled. During the first iteration of the face labeling process (e.g., the method illustrated in FIG. 5) executed by face labeler 118 for a set of digital images, none of the faces are labeled. In such a case, the methods described above for selecting a representative face from each cluster of similar faces may be employed by face labeler 118. During subsequent iterations of the face labeling process, some of the active faces may be associated with labels. When one or more of the faces in a cluster of similar faces is labeled, face labeler 118 may consider additional criteria when selecting a representative face for the cluster. For example, if a face in a cluster of similar faces is already associated with a label, then the labeled face may be automatically chosen by face labeler 118 as the representative face for the cluster.

As indicated at 504 of FIG. 5, the method illustrated in FIG. 5 may include receiving a label, or a name, for each representative face of each cluster. Face labeler 118 may display the representative faces to a user, via user interface 110, and request that the user input a label for each representative face. In some embodiments, a question or prompt may be presented with the representative faces, such as "Please label these faces," or "Please name these faces." User interface 110 may provide various mechanisms for a user to assign a label to a face. For example, a user may be presented with a text box in which the user may type the desired label, or name for a particular face. In other embodiments, for example, a user may also have an option to select a name from a drop-down menu, wherein the drop-down menu may include contacts from the user's address book. In various embodiments, other methods may be employed for receiving user input to label a face via user interface 110. From the example illustrated in FIG. 3, face 2 from Group X and face 3 from Group Y (the representative faces) may be presented to a user via user interface 110, along with a request for the user to label the faces. As an example, the user may provide a label of "Bob" for face 2 and a label of "Jane" for face 3.

When a cluster has more than one representative face, all of the representative faces for the cluster may be presented to the user for labeling. In some embodiments, a label may exist which allows a user to indicate that they do not wish to assign a label to a particular face. For example, such a label may state: "don't label this face." For example, a set of digital images may include a number of faces of strangers that the user doesn't want to label. The user may label some or all of these faces with the "don't label this face" label. In some embodiments, the system may learn to identify faces that are most likely faces of strangers and may ask the user "Are these faces of strangers?" In some embodiments, the system will not include faces labeled as "don't label this face" in any further face labeling processes.

As indicated at 506 of FIG. 5, the method illustrated in FIG. 5 may include determining features for each representative face from the label received for the representative face. Feature extractor 114 of face recognition module 100 may infer contextual features, such as gender, race and/or age from the label, or name, assigned to the face. Feature extractor 114 may update the feature vector for a face based on the gender, race and/or age inferred from the label. In various embodiments, face extractor 114 may use a classifier to infer gender, race and/or age from the name of a face. For example, face extractor 114 may use a support vector machine (SVM) classifier or a logistic regression classifier. In other embodiments, face extractor 114 may employ other types of classifiers.

Feature extractor 114 may infer the gender of a face in a digital image from the name (e.g., the label) assigned to the face. A person's name may be a good indicator of a person's gender, as names are typically associated with one gender or the other. For example, the name "Bob" may typically be associated with a male person and the name "Susan" may typically be associated with a female person. Feature extractor 114 may use a classifier to analyze a name assigned to a face and infer the gender of the face from the assigned name. A classifier may be trained to infer gender from a name using an existing dataset of names and associated genders. For example, the classifier may be presented with a variety of names, along with data indicating whether each name is associated with a male or female gender. From these various name and gender examples, the classifier may be trained to distinguish male and female names.

As described above, names such as "Bob" or "Susan" may be accurate indicators of a person's gender. However, other names, such as "Pat" or "Sam" may not clearly indicate male or female gender, as such names may be given to either males or females. In such cases, the classifier may not be able to determine the gender from the name and may depend on the visual features extracted from the face (as described in reference to 415 of FIG. 4) to determine the gender of the face. In some instances, the gender inferred from the name of a face may conflict with the gender inferred from the visual features of the face. For example, the name may indicate a male person, but the visual features may indicate a female person. In such a case, the classifier may determine, based on a variety of factors, which of the gender indications may be more accurate. For example, if the name assigned to the face is known to have a very accurate correlation to gender (e.g., the name "Bob" is very likely to indicate a male), the classifier may use the gender indicated by the name. As another example, if the visual features used to infer the gender of the face are obscured, or inadequate, (e.g. the presence of sunglasses may obscure facial structure), the classifier may determine that the gender indicated by the name may be more accurate than the gender indicated by the visual features. In some instances, the classifier may not have been able to previously infer the gender from the visual features of a face (e.g. due to visual obstructions such as sunglasses, a profile image of the face, etc.). In such instances, the gender inferred by the classifier from the name of the face may be the only indicator of the gender of the face.

Feature extractor 114 may infer the race of a person whose face appears in a digital image from the name (e.g., the label) assigned to the face. Similar to the description above regarding inferring gender from a name, feature extractor 114 may use a classifier to infer a person's race. The classifier may be trained to recognize the race associated with a name using an existing dataset of names and associated races. The classifier may be able to immediately recognize common names as being associated with a particular race. For example, the classifier may be easily able to recognize the race associated with common names that exist in the training dataset. In other cases, for less common names, the classifier may analyze the structure of the name (e.g. the spelling of the name, the presence of vowels and/or consonants, etc) to determine the language or origin of the name. From the language or origin of the name, the classifier may infer the race of the person. As described above, when a conflict exists between the race inferred from visual features and the race inferred from a name, the classifier may determine which indicator of race is likely to be more accurate.

Feature extractor 114 may infer the age of a face from the name (e.g., the label) assigned to the face and the timestamp of the digital image in which the face appears. Similar to the descriptions above regarding inferring gender and race from a name assigned to a face, feature extractor 114 may use a classifier to infer a person's age. The classifier may be trained to infer the age of a face in an image using an existing dataset of name trend statistics and the timestamp of the image in which the face appears. Name trend statistics which indicate the most popular names given to children during particular time periods are readily available, as known to persons skilled in the art. The classifier may compare a person's name to the name trend statistics to determine a time period during which the name was likely give to the person. This time period may indicate the person's birth date. The classifier may determine that the person's age at the time a digital image of the person was captured is the difference between the timestamp of the digital image and the person's birth date. As described above, when a conflict exists between the age inferred from visual features and the age inferred from a name, the classifier may determine which indicator of age is likely to be more accurate.

Feature vector 114 may update the feature vector for a face based on the gender, race and/or age inferred from the name associated with the face. As previously described, a feature vector for a face may include visual and/or contextual features determined from a digital image of the face. Accordingly, the feature vector may include information which indicates the gender, race and/or age of the face, as determined from the digital image of the face. The classifier may determine that the features (e.g., gender, race and/or age) inferred from the name of the face are likely to be more accurate than the features currently indicated in the feature vector (e.g., features determined from the image of the face). In such a case, the classifier may update the feature vector with values representing the features inferred from the name of the face. As described above, a classifier may not be able to determine contextual features such as gender, race and/or age from a digital image of the face (e.g., due to obstructions of facial structure). In this case, the classifier may add values representing the gender, race and/or age inferred from the name assigned to a face to the feature vector for the face.

As indicated at 508, the method illustrated in FIG. 5 may include comparing the features of each representative face to the features of the other faces in the same cluster as the representative face. As described above in reference to 506, the features of a representative face may be updated after the face has been labeled. For example, feature extractor 114 may determine a gender of the face based on the label assigned to the face. As another example, the classifier may determine that the age previously determined for a face was incorrect and may, as a result, change the age of the face. Accordingly, if the features of the representative face have changed, the face may again be compared to the other faces in the cluster.

Face comparator 116 may compare the feature vector of the representative face to the feature vectors of the other faces in the cluster. As described above in reference to 230 of FIG. 2, face comparator 116 may employ a classifier to perform the feature vector comparison. The classifier may perform the feature comparison for a pair of faces by comparing corresponding elements of the feature vectors which represent the features of the pair of faces. In some embodiments, the classifier may compare only the gender, race and/or age features of the feature vectors. In other embodiments, the classifier may compare only the features updated as a result of new features determined from the label of the representative face. For example, if only the gender of a representative face is changed based on the label of the representative face, the classifier may only compare only the gender of the representative faces to the other faces in the cluster. As described above, the classifier may calculate a value which represents the comparison of each feature.

The features inferred from the label of a representative face may enable a more accurate comparison between two faces. For example, for a face for which gender cannot be determined from visual features of the image of the face (e.g., due to presence of sunglasses or a profile image), gender may be inferred from a label assigned to the face. The feature vector of the face may then include a value indicating gender, which may be compared to other features in a cluster. This comparison, with the newly added gender feature, may indicate that the representative face of a cluster is either more similar to, or more distant from, other faces in the cluster than previously determined.

As indicated at 510, the method illustrated in FIG. 5 may include updating, based on the feature comparison, the distances between each representative face and each of the other faces in the same cluster as the representative face. Face comparator 116 may calculate a new distance between a representative face and another face in a same cluster, similar to the distance calculation described above in reference to 235 above. As describe above, a distance between two faces may indicate a measure of similarity (or, dissimilarity) between the two faces. A smaller distance between two faces may correspond to a strong similarity between the two faces and a larger distance between two faces may correspond to a lesser similarity between the two faces. The distance between two faces, $face_i$ and $face_j$ may be represented as $d_{i,j}$. Face comparator 116 may use a method similar to that described above in reference to 235 of FIG. 2, to calculate new combined distance values between each pair of faces. Face comparator 116 may update system memory with the newly calculated distances. For example, face comparator 116 may update, as appropriate, the distance values of distance array 601 illustrated in FIG. 7.

As indicated at 512, the method illustrated in FIG. 5 may include, for each cluster, suggesting the label of the representative face as the label for faces in the cluster which are similar to the representative face. Face labeler 118 may determine, based on the distances calculated in 510, faces within a cluster that are similar to the representative face of the cluster. For example, face labeler may determine faces in the cluster within a certain distance of the representative face. More specifically, a face within a certain distance of the representative face may be associated with a distance value (calculated as in 510) that is below a particular threshold. Each face in a cluster having a distance from the representative face below a particular threshold may be considered likely to be the same face as the representative face. Accordingly, face labeler may present such faces to a user, via user interface 100, and suggest that the faces receive the same label as the representative face.

Figure 6:
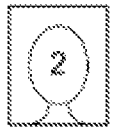
FIG. 6 illustrates a graphical user interface (GUI) 400 that may be used to present suggested labels to a user, according to some embodiments.
Figure 6:
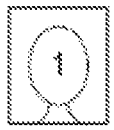
Figure 6:
Figure 6:
Figure 6:
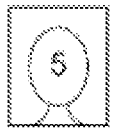

FIG. 6 illustrates an embodiment of a graphical user interface (GUI) 400 that may be used to present suggested labels to a user. In some embodiments, the user interface may display one or more of the representative faces that have been previously labeled by the user (as in 504). As shown in FIG. 6, GUI 400, at 402, may display representative face 2 of group X (from FIG. 3). As shown at 402, face 2 may be displayed with a message reminding the user that face 2 has been labeled "Bob." Similarly, GUI 400, at 406, displays representative face 3 of group Y (from FIG. 3) that has previously been labeled by the user as "Jane". As shown at 406, face 3 may be displayed with a message reminding the user that face 3 has been labeled "Jane." Regions 404 and 406 of GUI 400 may display faces within a cluster that have been determined to be within a certain distance of the representative face of the cluster. For example, as shown in FIG. 6, faces 1 and 4 of group X may be displayed at 404 and face 3 may be displayed at 408.

Regions 404 and 406 of GUI 400 may also suggest to the user that the displayed faces may be the same as the representative face and may request user feedback on an appropriate label for each face. As shown in FIG. 6, for each face displayed in region 404 and 406, an interface for receiving user feedback on the suggested label is presented. A user may indicate, via selection of the "Yes" check box, that the person is the same and, therefore, the same label should be applied.

A user may indicate, by selecting the "No" check box, that the person is the same and, therefore, the same label should not be applied. When a user indicates that a face is not the same (e.g., via selection of the "No" check box), the user may also enter a label for the face via a text entry box. As an example, in region 404 of FIG. 6, a user has selected the "Yes" checkbox for both faces 1 and 4, indicating that both faces are "Bob." As another example, in region 406 of FIG. 6, a user has selected the "No" checkbox for face 5, indicating that face 5 is not "Jane." In region 406, the user has provided input in the text entry box which indicates that face 5 is "Sarah." In other embodiments, different arrangement or combination of elements, descriptions, queries, or interactive controls (such as check boxes, pull-down menus, etc. may be used in GUI 400.

As indicated at 514, the method illustrated in FIG. 5 may include assigning labels to faces dependent on the feedback received for the suggested labels. Face labeler 118 may assign labels to faces for which the user has indicated positive feedback on a suggested label. For example, as shown at 404 of FIG. 6, a user may indicate, via selection of the "Yes" checkbox, that a face is the same as the representative face of a cluster. In such an example, face labeler may assign the label of the representative to face, based on the user's feedback. A user may provide negative feedback on a suggested label, but may provide input indicating a correct label. For example, as shown at 408 of FIG. 6, the user has entered the label "Sarah" to indicate that the face should be assigned the label "Sarah." In such an example, face labeler 118 may assign the user-specified label to the face.

Face recognition module 100 may also update the distance values between pairs of faces based on the feedback received for the suggested labels. For example, for two faces that the user has confirmed are different faces (e.g., by assigning different labels), the distance between the faces may be set to infinity, or a maximum distance value. Face recognition module 100 may update distance array 601, shown in FIG. 6, to indicate the new distance value between the two faces. To update distance array 601, face recognition module 100, may update the distance value in the appropriate array location of distance array 601, which indicates a distance between two specific faces.

System Scalability

As described above, in reference to 245 of FIG. 2, labeled faces may be deactivated. Face recognition module 100 may deactivate faces to reduce the amount of system memory used to store data corresponding to the deactivated faces (e.g., distance values, feature vectors, etc.). As noted above, the face recognition system is scalable, such that only a predetermined amount of system resources (e.g. system memory) are used by the face recognition system at any one time. Accordingly, labeled faces may be deactivated (e.g., removed from system memory) to allow unlabeled faces to be activated (e.g., added to system memory) without increasing the amount of system memory used by the face recognition system.

FIG. 7 illustrates a reduction in system memory use due to the deactivation of labeled faces. As illustrated in FIG. 7, memory 600 stores a distance array 601 and feature vectors 602 for a set of active faces 1-5. As shown in FIG. 7, and as previously described for the example illustrated in FIG. 6, faces 1, 2 and 4 have been associated with the label "Bob." Since several faces labeled "Bob" are present in the set of active faces, one or more of the faces labeled "Bob" may be deactivated such that system memory space is available for newly activated faces.

In various embodiments, face recognition module 100 may use a variety of methods for deactivating faces that are associated with the same label. For example, face recognition module 100 may simply deactivate all but one of the faces which have the same label. Face recognition module 100 may determine, from the set of faces which have the same label, a face with the largest amount of feature data in a feature vector. Face recognition module 100 may leave the face with the largest amount of feature data activated and deactivate the remaining faces with the same label. In other embodiments, face recognition module 100 may form a composite feature vector which is a combination of the feature vectors of all the faces with a same label. For example, face recognition module 100 may create one feature vector which combines the features from all of the faces with the same label. Face recognition module 100 may choose a representative face to leave activated, associate the composite feature vector with this face, and deactivate the other faces. In yet other embodiments, face recognition module 100 may leave more than one face with a same label activated. For example, ten faces with the same label may exist in the set of activated faces. Face recognition module 100 may choose to leave two of the ten faces activated (possibly the two faces with the largest amount of feature data) and deactivate the other eight faces.

FIG. 7 illustrates a reduced system memory footprint, 610. Memory 610 includes a reduced distance array 611 and a reduced set of feature vectors 612. In the example illustrated in FIG. 7, face recognition module 100 has selected one of faces 1, 2 or 4 (all associated with the label "Bob") to remain activated and represent the label "Bob." Face recognition module 100 has deactivated the remaining two faces labeled as "Bob." As shown in 611, the distance array has been reduced, reflecting the removal of distance values for the two deactivated faces. As an example, with face two selected as the remaining activated face, the new distances for the face labeled "Bob" may be determined as follows: $d_{B,3}=d_{2,3}$; $d_{B,5}=d_{2,5}$. As shown in 612, two of the feature vectors have been removed from system memory, as a result of the deactivation of the two faces. As an example, with face two selected as the remaining activated face, $H/R_B=H/R_2$. Accordingly, system memory 600 has been reduced to a smaller footprint (e.g., system memory 610) due to the deactivation of two faces.

Some embodiments of the face recognition system may provide a mechanism for a user to search a collection of digital images for faces that match an identified face. For example, a user may identify a particular face in an image and request a search for all faces in the set of digital images that match the identified face. In some embodiments, the user may also provide a label indicating the name of the identified face. In response to the user's search request, the face recognition system may determine visual and non-visual features of the identified face. If the user has supplied a name for the identified face, the face recognition system may also determine contextual features of the face from the name of the face. The face recognition system may create a feature vector for the identified face which includes all features determined for the identified face.

The face recognition system may compare the feature vector for the identified face to feature vectors for each of the detected faces in the digital image collection to locate faces that match the identified face. The face recognition system may, as described above, execute the feature vector comparison on an active group of the detected faces in order to limit the use of system resources. All located faces which match the identified face may be displayed to the user by the face recognition system. In some embodiments, the display may include information indicating an image (e.g. an image name or number) in which each of the located faces appears.

Example System

Various components of embodiments of methods as illustrated and described in the accompanying description may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, multitouch device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods as illustrated and described in the accompanying description may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those for methods as illustrated and described in the accompanying description, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, configured to implement embodiments of methods as illustrated and described in the accompanying description, and data storage 1035, comprising various data accessible by program instructions 1025. In one embodiment, program instruction 1025 may include software elements of methods as illustrated and described in the accompanying description. Data storage 1035 may include data that may be used in embodiments. In other embodiments, other or different software elements and/or data may be included.

Those skilled in the art will appreciate that computer system 1000 is merely illustrative and is not intended to limit the scope of methods as illustrated and described in the accompanying description. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc. Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method for facial recognition in digital images, comprising:
   determining, for each of a plurality of faces in a plurality of digital images, visual and non-visual features;
   activating a subset of the plurality of faces, wherein the subset comprises a predetermined number of active faces, wherein at least one of the plurality of faces remains un-active;
   comparing the visual and non-visual features for a plurality of pairs of the active faces; and
   dependent on said comparing, calculating a distance for each one of the plurality of pairs of active faces, wherein the distance corresponds to a measure of similarity between faces in a pair.

2. The method of claim 1, further comprising:
   deactivating at least one of the active faces and activating at least one of the un-active faces to create one or more new active faces; and
   performing said comparing and said calculating on the one or more new active faces.

3. The method of claim 1, wherein said calculating the distance for each one of the plurality of pairs of active faces comprises calculating a facial distance between the respective pair of active faces and calculating a clothes distance between the respective pair of active faces, and wherein the distance for the respective pair of active faces is dependent on the facial distance and the clothes distance.

4. The method of claim 1, further comprising:
   forming, dependent on said calculating, a group of similar faces, wherein the group is a subset of the set of active faces;
   selecting, dependent on said calculating, a representative face from the group of similar faces;
   receiving a label corresponding to the representative face; and
   determining, from the received label, one or more features for the representative face.

5. The method of claim 4, wherein said determining visual features for each one of the plurality of faces comprises determining a race and an age for each one of the plurality of faces, and further comprising:
   determining, dependent on the received label, a race for the representative face and an age for the representative face;
   comparing the race for the representative face to the race for each one of the active faces;
   comparing the age for the representative face to the age for each one of the active faces; and
   dependent on said comparing, calculating a race distance between the representative face and each one of the active faces and calculating an age distance between the representative face and each one of the active faces.

6. The method of claim 4, wherein said determining one or more features for the representative face comprises a trained gender classifier determining, dependent on the received label, a gender for the representative face.

7. The method of claim 6, wherein said determining visual features for each one of the plurality of faces comprises determining a gender for each one of the plurality of faces, and further comprising:
   comparing the gender for the representative face to the gender for each one of the active faces; and dependent on said comparing, calculating a gender distance between the representative face and each one of the active faces.

8. A system, comprising:
a memory; and
one or more processors coupled to the memory, wherein the memory comprises program instructions executable by the one or more processors to implement a face recognition module configured to:
  determine, for each of a plurality of faces in a plurality of digital images, visual and non-visual features;
  activate a subset of the plurality of faces, wherein the subset comprises a predetermined number of active faces, wherein at least one of the plurality of faces remains un-active;
  compare the visual and non-visual features for a plurality of pairs of the active faces; and
  dependent on the comparison, calculate a distance for each one of the plurality of pairs of active faces, wherein the distance corresponds to a measure of similarity between faces in a pair.

9. The system of claim 8, wherein the face recognition module is further configured to:
  deactivate at least one of the active faces and activate at least one of the un-active faces to create one or more new active faces; and
  perform said comparing and said calculating on the one or more new active faces.

10. The system of claim 8, wherein said calculating the distance for each one of the plurality of pairs of active faces comprises calculating a facial distance between the respective pair of active faces and calculating a clothes distance between the respective pair of active faces, and wherein the distance for the respective pair of active faces is dependent on the facial distance and the clothes distance.

11. The system of claim 8, wherein the face recognition module is further configured to:
  form, dependent on said calculating, a group of similar faces, wherein the group is a subset of the set of active faces;
  select, dependent on said calculating, a representative face from the group of similar faces;
  receive a label corresponding to the representative face; and
  determine, from the received label, one or more features for the representative face.

12. The system of claim 11, wherein said determining one or more features for the representative face comprises a trained gender classifier determining, dependent on the received label, a gender for the representative face.

13. The system of claim 12, wherein said determining visual features for each one of the plurality of faces comprises determining a gender for each one of the plurality of faces, and wherein the face recognition module is further configured to:
  compare the gender for the representative face to the gender for each one of the active faces; and
  dependent on the comparison, calculate a gender distance between the representative face and each one of the active faces.

14. A non-transitory computer-readable storage medium storing program instructions executable on a computer to implement a face recognition module configured to:
  determine, for each of a plurality of faces in a plurality of digital images, visual and non-visual features;
  activate a subset of the plurality of faces, wherein the subset comprises a predetermined number of active faces, wherein at least one of the plurality of faces remains un-active;
  compare the visual and non-visual features for a plurality of pairs of the active faces; and
  dependent on the comparison, calculate a distance for each of the plurality of pairs of active faces, wherein the distance corresponds to a measure of similarity between faces in a pair.

15. The non-transitory computer-readable storage medium of claim 14, wherein the face recognition module is further configured to:
  deactivate at least one of the active faces and activating at least one of the un-active faces to create one or more new active faces; and
  perform said comparing and said calculating on the one or more new active faces.

16. The non-transitory computer-readable storage medium of claim 14, wherein said calculating the distance for each one of the plurality of pairs of active faces comprises calculating a facial distance between the respective pair of active faces and calculating a clothes distance between the respective pair of active faces, and wherein the distance for the respective pair of active faces is dependent on the facial distance and the clothes distance.

17. The non-transitory computer-readable storage medium of claim 14, wherein the face recognition module is further configured to:
  form, dependent on said calculating, a group of similar faces, wherein the group is a subset of the set of active faces;
  select, dependent on said calculating, a representative face from the group of similar faces;
  receive a label corresponding to the representative face; and
  determine, from the received label, one or more features for the representative face.

18. The non-transitory computer-readable storage medium of claim 17, wherein said determining one or more features for the representative face comprises a trained gender classifier determining, dependent on the received label, a gender for the representative face.

19. The non-transitory computer-readable storage medium of claim 18, wherein said determining visual features for each one of the plurality of faces comprises determining a gender for each one of the plurality of faces, wherein the face recognition module is further configured to:
  compare the gender for the representative face to the gender for each one of the active faces; and
  dependent on the comparison, calculate a gender distance between the representative face and each one of the active faces.

20. A method for facial recognition in digital images, comprising:
  detecting a plurality of faces in a plurality of digital images;
  determine, for each face detected in the plurality of digital images, visual or non-visual features;
  create, based on the determined visual or non-visual features of each face detected in the plurality of digital images, a feature vector representing the determined visual or non-visual features of each face;
  activating a subset of the plurality of faces that includes a predetermined number of active faces, at least one of the plurality of faces remaining un-active; and
  calculating, based on the feature vectors of the active faces, a distance for each one of a plurality of pairs of the active faces, the distance corresponding to a measure of similarity between the active faces in a pair.

* * * * *

UNITED STATES PATENT AND TRADEMARK OFFICE
CERTIFICATE OF CORRECTION

PATENT NO.        : 8,503,739 B2                                  Page 1 of 1
APPLICATION NO.   : 12/857351
DATED             : August 6, 2013
INVENTOR(S)       : Lubomir D. Bourdev et al.

It is certified that error appears in the above-identified patent and that said Letters Patent is hereby corrected as shown below:

In the Claims

Column 34, Line 29, between "...calculating a" and "distance...", delete "clothes" and insert -- close --, therefor.

Column 34, Line 32, between "...and the" and "distance.", delete "clothes" and insert -- close --, therefor.

Column 35, Line 32, between "...calculating a" and "distance...", delete "clothes" and insert -- close --, therefor.

Column 35, Line 35, between "...and the" and "distance.", delete "clothes" and insert -- close --, therefor.

Column 36, Line 19, between "...calculating a" and "distance...", delete "clothes" and insert -- close --, therefor.

Column 36, Line 22, delete "clothes" and insert -- close --, therefor.

Signed and Sealed this
Third Day of December, 2013

Margaret A. Focarino
*Commissioner for Patents of the United States Patent and Trademark Office*